United States Patent
Zhang et al.

(10) Patent No.: US 11,669,109 B2
(45) Date of Patent: Jun. 6, 2023

(54) METHOD AND APPARATUS FOR YAW FUSION AND AIRCRAFT

(71) Applicant: AUTEL ROBOTICS CO., LTD., Guangdong (CN)

(72) Inventors: Tianbao Zhang, Guangdong (CN); Yingjie Li, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 0 days.

(21) Appl. No.: 17/651,835

(22) Filed: Feb. 21, 2022

(65) Prior Publication Data

US 2022/0214699 A1 Jul. 7, 2022

Related U.S. Application Data

(63) Continuation of application No. PCT/CN2020/110592, filed on Aug. 21, 2020.

(30) Foreign Application Priority Data

Aug. 21, 2019 (CN) .......................... 201910774173.1

(51) Int. Cl.
*G05D 1/08* (2006.01)
*G01C 21/16* (2006.01)
(Continued)

(52) U.S. Cl.
CPC ............. *G05D 1/0816* (2013.01); *B64C 1/16* (2013.01); *G01S 19/53* (2013.01)

(58) Field of Classification Search
CPC ......... G05D 1/0816; B64C 1/16; G01S 19/53; G01S 19/396; G01C 21/165; G01C 21/20
(Continued)

(56) References Cited

U.S. PATENT DOCUMENTS 5,604,534 A * 2/1997 Hedges .................... G01V 8/10
348/145
8,065,074 B1 * 11/2011 Liccardo ............ G01C 21/1654
73/504.03
(Continued)

FOREIGN PATENT DOCUMENTS

CN 101000245 A 7/2007
CN 101865693 A 10/2010
(Continued)

OTHER PUBLICATIONS

The International Search Report dated Nov. 25, 2020 PCT/CN2020/110592.

*Primary Examiner* — Jaime Figueroa

(57) ABSTRACT

Embodiments of the present application relate to the technical field of aircrafts and disclose a method and apparatus for yaw fusion and an aircraft. The method for yaw fusion is applicable to an aircraft and includes: acquiring global positioning system (GPS) data, inertial measurement unit (IMU) data, and magnetometer data, wherein the GPS data includes GPS location, velocity, acceleration information, and GPS velocity signal quality, and the IMU data includes IMU acceleration information and IMU angular velocity information; determining a corrected yaw according to the IMU data, the GPS data, and the magnetometer data; determining a magnetometer alignment deviation angle according to the magnetometer data, the GPS data, and the corrected yaw; determining a GPS realignment deviation angle according to the GPS data and the IMU acceleration information; and generating a fused yaw according to the corrected yaw, the magnetometer alignment deviation angle, and the GPS realignment deviation angle.

21 Claims, 11 Drawing Sheets

(51) Int. Cl.
*B64C 1/16* (2006.01)
*G01S 19/53* (2010.01)

(58) Field of Classification Search
USPC .......................................................... 701/1–18
See application file for complete search history.

(56) References Cited

U.S. PATENT DOCUMENTS

| | | | | |
|---|---|---|---|---|
| 8,275,544 | B1* | 9/2012 | Wells | G01C 21/1654 |
| | | | | 342/146 |
| 8,326,561 | B2* | 12/2012 | Navarro, Jr. | G01C 21/203 |
| | | | | 702/93 |
| 8,577,607 | B2* | 11/2013 | Williamson | G01C 21/165 |
| | | | | 342/357.49 |
| 8,682,581 | B2* | 3/2014 | Psiaki | G01S 19/215 |
| | | | | 701/469 |
| 8,688,375 | B2* | 4/2014 | Funk | G01S 19/49 |
| | | | | 340/995.19 |
| 8,706,414 | B2* | 4/2014 | Funk | G01S 19/49 |
| | | | | 340/995.19 |
| 8,955,749 | B2* | 2/2015 | Elefante | F41G 3/225 |
| | | | | 235/407 |
| 9,121,940 | B2* | 9/2015 | Psiaki | G01S 19/215 |
| 9,786,176 | B2* | 10/2017 | Northrup | G08G 1/144 |
| 9,856,016 | B2* | 1/2018 | Mueller | B64D 45/00 |
| 9,900,669 | B2* | 2/2018 | Touma | H04Q 9/00 |
| 10,309,786 | B2* | 6/2019 | Hamilton | G01C 21/1652 |
| 10,508,970 | B2* | 12/2019 | Kwon | G01M 5/0075 |
| 10,989,563 | B2* | 4/2021 | Anderson | G06F 3/012 |
| 11,204,257 | B2* | 12/2021 | Anderson | G01C 19/5776 |
| 2002/0165669 | A1* | 11/2002 | Pinto | G01S 19/36 |
| | | | | 701/408 |
| 2004/0093130 | A1* | 5/2004 | Osder | B64C 27/18 |
| | | | | 244/175 |
| 2008/0077326 | A1* | 3/2008 | Funk | G01C 21/1654 |
| | | | | 701/500 |
| 2009/0292495 | A1* | 11/2009 | Navarro, Jr. | G01C 21/203 |
| | | | | 702/92 |
| 2011/0238307 | A1* | 9/2011 | Psiaki | G01C 21/28 |
| | | | | 701/469 |
| 2012/0065883 | A1* | 3/2012 | Williamson | G01S 19/47 |
| | | | | 701/501 |
| 2013/0166198 | A1* | 6/2013 | Funk | G01S 19/49 |
| | | | | 701/446 |
| 2014/0232592 | A1* | 8/2014 | Psiaki | G01C 21/28 |
| | | | | 342/357.25 |
| 2014/0319217 | A1* | 10/2014 | Elefante | F41G 3/16 |
| | | | | 235/407 |
| 2016/0107751 | A1* | 4/2016 | D'Andrea | B64D 45/00 |
| | | | | 701/4 |
| 2016/0221663 | A1* | 8/2016 | Landers | G01C 21/1654 |
| 2017/0018184 | A1* | 1/2017 | Northrup | H04W 4/02 |
| 2017/0219351 | A1* | 8/2017 | Hamilton | G01S 19/19 |
| 2018/0033244 | A1* | 2/2018 | Northrup | G08G 1/0175 |
| 2019/0033889 | A1* | 1/2019 | von Flotow | B64U 80/70 |
| 2019/0390976 | A1* | 12/2019 | Anderson | G06F 3/013 |
| 2020/0003357 | A1* | 1/2020 | Su | B64D 47/08 |
| 2021/0318141 | A1* | 10/2021 | Anderson | G01C 21/20 |

FOREIGN PATENT DOCUMENTS

| | | |
|---|---|---|
| CN | 102607557 A | 7/2012 |
| CN | 105865455 A | 8/2016 |
| CN | 108549399 A | 9/2018 |
| CN | 110487277 A | 11/2019 |

\* cited by examiner

METHOD AND APPARATUS FOR YAW FUSION AND AIRCRAFT

CROSS REFERENCE

The present application is a continuation of International Application No. PCT/CN2020/110592, filed on Aug. 21, 2020, which claims priority to Chinese patent application No. 201910774173.1, filed on Aug. 21, 2019, which is incorporated herein by reference in its entirety.

TECHNICAL FIELD

The present application relates to the technical field of aircrafts, and in particular, to a method and apparatus for yaw fusion and an aircraft.

BACKGROUND

Aircrafts, such as unmanned aerial vehicles (UAVs), have been used more widely due to their advantages of small size, light weight, flexible maneuverability, fast response, unmanned driving, and low operation requirements. Various actions (or attitudes) of an unmanned aerial vehicle are usually implemented by controlling a plurality of drive motors in the power device of the unmanned aerial vehicle to operate at different rotational speeds. The yaw is an important parameter in the control of the flight attitude of the unmanned aerial vehicle, i.e., the yaw fusion of the unmanned aerial vehicle is particularly important for the attitude control of the unmanned aerial vehicle. If the yaw fusion of the unmanned aerial vehicle has a large error or the fusion precision is low, the unmanned aerial vehicle may fail to fly according to the preset direction or trajectory, or may orbit unexpectedly or even become unstable and crash in severe cases. Therefore, how to improve the fusion precision and convergence speed of the yaw of the aircraft is of great significance.

At present, the yaw of the aircraft (such as a UAV) is usually obtained based on data acquired by a magnetometer, and the yaw is corrected based on the data acquired by the magnetometer. However, the yaw obtained by this method is easily affected by external factors. Especially when the magnetometer is in an environment with strong magnetic interference, the data of the magnetometer may be seriously erroneous, resulting in a large deviation in the correction of the yaw and slow convergence of the yaw.

In order to improve the accuracy of yaw estimation of the UAV, currently a commonly used method is to use an external GPS module to estimate a yaw by GPS to correct the yaw value from the magnetometer. However, the GPS signal may sometimes be unstable, and consequently in some cases, the yaw estimated by the magnetometer cannot be effectively corrected even if there is a deviation. That is to say, using the external GPS module to correct the yaw of the UAV can improve the estimation accuracy of the yaw of the aircraft to a certain extent, but the effect is not good. Especially when the GPS signal is weak, using the external GPS module cannot effectively correct the heading direction. Due to the lack of an effective alignment scheme, the convergence speed of the yaw is slow and the precision is not high.

SUMMARY

Embodiments of the present invention provide a method and apparatus for yaw fusion and an aircraft, to effectively improve the fusion precision and convergence speed of the yaw.

To solve the above technical problem, the embodiments of the present invention provide the following technical solutions.

According to a first aspect, an embodiment of the present invention provides a method for yaw fusion, applicable to an aircraft, the method including:

acquiring global positioning system (GPS) data, inertial measurement unit (IMU) data, and magnetometer data, where the GPS data includes GPS location, velocity, acceleration information, and GPS velocity signal quality, and the IMU data includes IMU acceleration information and IMU angular velocity information;

determining a corrected yaw according to the IMU data, the GPS data, and the magnetometer data;

determining a magnetometer alignment deviation angle according to the magnetometer data, the GPS data, and the corrected yaw;

determining a GPS realignment deviation angle according to the GPS data and the IMU acceleration information; and generating a fused yaw according to the corrected yaw, the magnetometer alignment deviation angle, and the GPS realignment deviation angle.

In some embodiments, the method further includes:

calculating a magnetometer yaw according to the magnetometer data; and calculating a yaw error angle according to the magnetometer yaw and the fused yaw.

In some embodiments, the calculating a magnetometer yaw according to the magnetometer data further includes:

calibrating the magnetometer data according to a preset calibration matrix to generate calibrated magnetometer data;

generating a rotation transformation matrix according to an attitude angle of the aircraft;

performing coordinate transformation on the calibrated magnetometer data from a body coordinate system to an earth coordinate system according to the rotation transformation matrix to generate magnetometer data in the earth coordinate system; and calculating the magnetometer yaw according to the magnetometer data in the earth coordinate system and magnetometer data of a standard magnetic field of a current location of the aircraft.

In some embodiments, the determining a corrected yaw according to the IMU data, the GPS data, and the magnetometer data further includes:

acquiring magnetic field signal quality of the current location of the aircraft;

generating a GPS angular velocity correction amount according to the yaw deviation angle;

multiplying a GPS acceleration correction weight coefficient and the GPS angular velocity correction to generate a GPS weighted correction amount;

generating a magnetometer correction amount according to the yaw error angle;

multiplying the magnetic field signal quality and the magnetometer correction amount to generate a magnetometer weighted correction amount;

fusing the IMU angular velocity information, the GPS weighted correction amount, and the magnetometer weighted correction amount to generate a corrected yaw angular velocity; and integrating the corrected yaw angular velocity to generate the corrected yaw, where the GPS acceleration correction weight coefficient is obtained by multiplying the GPS velocity signal quality and GPS acceleration signal quality, and the GPS acceleration signal quality is calculated from the GPS acceleration information.

In some embodiments, the determining a magnetometer alignment deviation angle according to the magnetometer data, the GPS data, and the corrected yaw includes:

calculating a magnetometer alignment yaw according to the magnetometer yaw; and determining the magnetometer alignment deviation angle according to the corrected yaw and the magnetometer alignment yaw.

In some embodiments, the calculating a magnetometer alignment yaw according to the magnetometer yaw further includes:

acquiring an above-ground height of the aircraft and a stationary flag;

making a logical judgment on the magnetic field signal quality and the stationary flag, and generate a magnetometer initial alignment pulse;

making a logical judgment on the above-ground height and the magnetic field signal quality, and generate a magnetometer realignment pulse;

generating a magnetometer alignment pulse according to the magnetometer initial alignment pulse and the magnetometer realignment pulse; and inputting the magnetometer alignment pulse to an enable module of the aircraft, and when the enable module detects that the magnetometer alignment pulse has a rising edge, using the magnetometer yaw as the magnetometer alignment yaw In some embodiments, the determining a GPS realignment deviation angle according to the GPS data and the IMU acceleration information includes:

calculating a yaw deviation angle according to the GPS acceleration information and the IMU acceleration information;

calculating GPS acceleration signal quality according to the GPS acceleration information;

multiplying the GPS velocity signal quality and the GPS acceleration signal quality to generate a GPS acceleration correction weight coefficient;

determining whether the GPS acceleration correction weight coefficient is greater than a preset GPS realignment threshold; if yes, controlling a realignment flag bit of the aircraft to output a high level signal; otherwise, controlling the realignment flag bit to output a low level signal;

if the signal of the realignment flag bit has a rising edge, generating a realignment pulse signal; and inputting the realignment pulse signal into an enable module of the aircraft, and when the enable module detects that the realignment pulse signal has a rising edge, using the yaw deviation angle as the GPS realignment deviation angle.

According to a second aspect, an embodiment of the present invention provides an apparatus for yaw fusion, applicable to an aircraft, the apparatus including:

an acquisition module, configured to acquire GPS data, IMU data, and magnetometer data, where the GPS data includes GPS location, velocity, acceleration information, and GPS velocity signal quality, and the IMU data includes IMU acceleration information and IMU angular velocity information;

a corrected yaw module, configured to determine a corrected yaw according to the IMU data, the GPS data, and the magnetometer data;

a magnetometer alignment deviation angle module, configured to determine a magnetometer alignment deviation angle according to the magnetometer data, the GPS data, and the corrected yaw;

a GPS realignment deviation angle module, configured to determine a GPS realignment deviation angle according to the GPS data and the IMU acceleration information; and a yaw fusion module, configured to generate a fused yaw according to the corrected yaw, the magnetometer alignment deviation angle, and the GPS realignment deviation angle.

In some embodiments, the apparatus further includes: a yaw error angle module including:

a magnetometer yaw unit, configured to calculate a magnetometer yaw according to the magnetometer data; and a yaw error angle unit, configured to calculate a yaw error angle according to the magnetometer yaw and the fused yaw.

In some embodiments, the magnetometer yaw unit is further configured to:

calibrate the magnetometer data according to a preset calibration matrix to generate calibrated magnetometer data;

generate a rotation transformation matrix according to an attitude angle of the aircraft;

perform coordinate transformation on the calibrated magnetometer data from a body coordinate system to an earth coordinate system according to the rotation transformation matrix to generate magnetometer data in the earth coordinate system; and calculate the magnetometer yaw according to the magnetometer data in the earth coordinate system and magnetometer data of a standard magnetic field of a current location of the aircraft.

In some embodiments, the corrected yaw module is further configured to:

acquire magnetic field signal quality of the current location of the aircraft;

generate a GPS angular velocity correction amount according to the yaw deviation angle;

multiply a GPS acceleration correction weight coefficient and the GPS angular velocity correction to generate a GPS weighted correction amount;

generate a magnetometer correction amount according to the yaw error angle;

multiply the magnetic field signal quality and the magnetometer correction amount to generate a magnetometer weighted correction amount;

fuse the IMU angular velocity information, the GPS weighted correction amount, and the magnetometer weighted correction amount to generate a corrected yaw angular velocity; and integrate the corrected yaw angular velocity to generate the corrected yaw, where the GPS acceleration correction weight coefficient is obtained by multiplying the GPS velocity signal quality and GPS acceleration signal quality, and the GPS acceleration signal quality is calculated from the GPS acceleration information.

In some embodiments, the magnetometer alignment deviation angle module includes:

a magnetometer alignment yaw unit, configured to calculate a magnetometer alignment yaw according to the magnetometer yaw; and a magnetometer alignment deviation angle unit, configured to determine the magnetometer alignment deviation angle according to the corrected yaw and the magnetometer alignment yaw.

In some embodiments, the magnetometer alignment yaw unit is further configured to: acquire an above-ground height of the aircraft and a stationary flag;

make a logical judgment on the magnetic field signal quality and the stationary flag, and generate a magnetometer initial alignment pulse;

make a logical judgment on the above-ground height and the magnetic field signal quality, and generate a magnetometer realignment pulse;

generate a magnetometer alignment pulse according to the magnetometer initial alignment pulse and the magnetometer realignment pulse; and input the magnetometer alignment pulse to an enable module of the aircraft, and when the enable module detects that the magnetometer alignment pulse has a rising edge, use the magnetometer yaw as the magnetometer alignment yaw.

In some embodiments, the GPS realignment deviation angle module includes:

a yaw deviation angle unit, configured to calculate a yaw deviation angle according to the GPS acceleration information and the IMU acceleration information;

a GPS realignment deviation angle unit, configured to:

calculate GPS velocity signal quality and GPS acceleration signal quality according to the GPS velocity information and the GPS acceleration information respectively;

multiply the GPS velocity signal quality and the GPS acceleration signal quality to generate a GPS acceleration correction weight coefficient;

determine whether the GPS acceleration correction weight coefficient is greater than a preset GPS realignment threshold; if yes, control a realignment flag bit of the aircraft to output a high level signal; otherwise, control the realignment flag bit to output a low level signal;

if the signal of the realignment flag bit has a rising edge, generate a realignment pulse signal; and input the realignment pulse signal into an enable module of the aircraft, and when the enable module detects that the realignment pulse signal has a rising edge, use the yaw deviation angle as the GPS realignment deviation angle.

According to a third aspect, an embodiment of the present invention provides an aircraft, including:

at least one processor; and a memory communicably connected to the at least one processor, where the memory stores instructions executable by the at least one processor, where the instructions are executed by the at least one processor to cause the at least one processor to execute the above method for yaw fusion.

According to a fourth aspect, an embodiment of the present invention further provides a non-volatile computer readable storage medium, storing computer-executable instructions therein, where the computer-executable instructions are configured to cause an aircraft to execute the above method for yaw fusion.

Beneficial effects of the embodiments of the present invention are as follows: Different from the prior art, the embodiments of the present invention provide a method for yaw fusion, applicable to an aircraft, the method including: acquiring GPS data, IMU data, and magnetometer data, where the GPS data includes GPS location, velocity, acceleration information, and GPS velocity signal quality, and the IMU data includes IMU acceleration information and IMU angular velocity information; determining a corrected yaw according to the IMU data, the GPS data, and the magnetometer data; determining a magnetometer alignment deviation angle according to the magnetometer data, the GPS data, and the corrected yaw; determining a GPS realignment deviation angle according to the GPS data and the IMU acceleration information; and generating a fused yaw according to the corrected yaw, the magnetometer alignment deviation angle, and the GPS realignment deviation angle. Whereby, the embodiments of the present invention can effectively improve the fusion precision and convergence speed of the yaw.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

Figure 1:
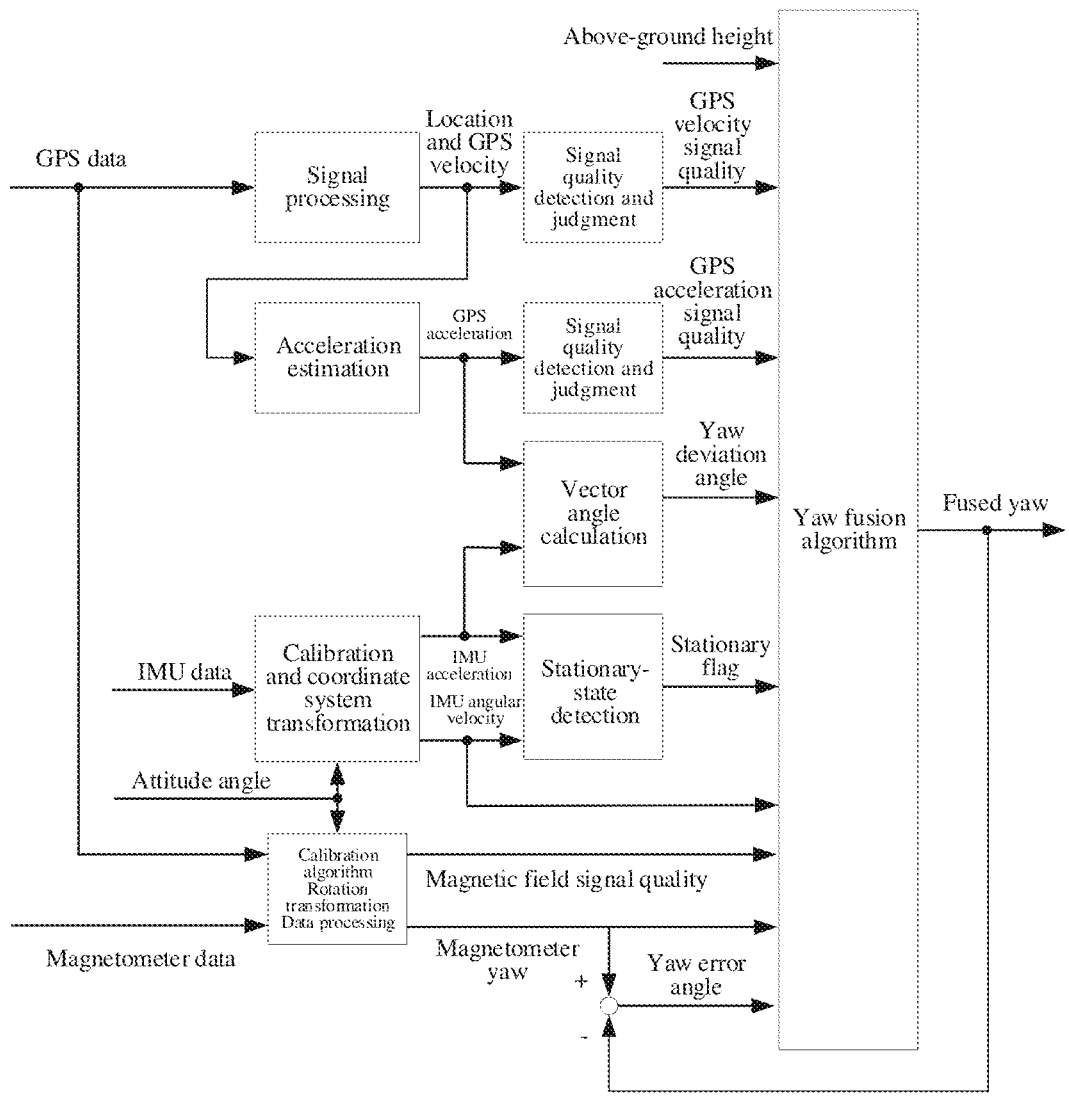
FIG. 1 is a functional block diagram of a method for yaw fusion according to an embodiment of the present invention.

To make the objectives, technical solutions and advantages of the embodiments of the present invention clearer, the technical solutions in the embodiments of the present invention will be described clearly and thoroughly with reference to the accompanying drawings in the embodiments of the present invention. Apparently, the embodiments described are merely some embodiments, rather than all of the embodiments of the present invention. All other embodiments obtained by a person of ordinary skill in the art without creative efforts based on the embodiments of the present invention shall fall within the protection scope of the present invention.

In addition, the technical features involved in various embodiments of the present invention described below can be combined with each other as long as they do not form a conflict with each other.

The method for yaw fusion provided by the embodiments of the present invention may be applied to various movable objects driven by a motor, including, but not limited to, an aircraft, a robot, and the like. The aircraft may include a UAV, an unmanned spacecraft, and the like. The UAV is used as an example for description below. The UAV includes a body, a controller, and a power system. The controller is connected to the power system, and the power system is installed on the body and is configured to provide power for flight of the aircraft. Specifically, the controller is configured to execute the above method for yaw fusion to align and correct a yaw of the aircraft, generate a control instruction according to the fused yaw of the aircraft, and send the control instruction to an electronic speed controller of the power system, and the electronic speed controller controls a drive motor of the power system according to the control instruction. Alternatively, the controller is configured to execute the method for yaw fusion to align and correct the yaw of the aircraft, and send the aligned and corrected yaw of the aircraft to the electronic speed controller, and the electronic speed controller generates a control instruction according to the corrected yaw of the aircraft, and controls the drive motor of the power system according to the control instruction.

The body includes: a central housing and one or more arms connected to the central housing. The one or more arms extend radially from the central housing. The connection between the arm and the central housing may means that the arm and the central housing are integrally formed or are fixed together. The power system is installed on the arm.

The controller is configured to execute the above method for yaw fusion to align and correct a yaw of the aircraft, generate a control instruction according to the aligned and corrected yaw of the aircraft, and send the control instruction to an electronic speed controller of the power device, so that the electronic speed controller controls a drive motor of the power device according to the control instruction. The controller is a device with a certain logic processing capability, such as a control chip, a single chip microcomputer, a microcontroller unit (MCU), and the like.

The power system includes the electronic speed controller, the drive motor and a propeller. The electronic speed controller is located in a cavity formed by the arm or the central housing. The electronic speed controller is connected to the flight controller and the drive motor. Specifically, the electronic speed controller is electrically connected to the drive motor and is configured to control the drive motor. The drive motor is installed on the arm, and a rotating shaft of the drive motor is connected to the propeller. The propeller is configured to be driven by the drive motor to generate a force that causes the UAV to move, e.g., a lift or thrust force that causes the UAV to move.

The set speeds and action (or attitudes) of the UAV are realized by using the electronic speed controller to control the drive motor. The electronic speed controller is configured to adjust a rotational speed of the drive motor of the UAV according to a control signal. The controller is an entity for executing the above method for yaw fusion, and the electronic speed controller controls the drive motor based on the control instruction generated according to the fused yaw of the aircraft. The principle of controlling the drive motor by the electronic speed controller is roughly as follows: The drive motor is an open-loop control element that converts an electrical pulse signal into an angular displacement or a linear displacement. In the case of non-overload, the rotational speed and stop position of the drive motor only depend on the frequency and number of pulses of the pulse signal, and are not affected by the change in load. When receiving a pulse signal, a driver drives the drive motor of the power system to rotate by a fixed angle in a set direction. The rotation of the drive motor is based on the fixed angle. Therefore, the electronic speed controller can control the angular displacement by controlling the number of pulses, so as to achieve accurate positioning; and can also control the rotational speed and acceleration of the driving motor by controlling the pulse frequency, so as to achieve speed adjustment.

At present, main functions of the UAV include aerial photography, real-time image transmission, detection of high-risk areas, and the like. In order to realize the functions such as aerial photography, real-time image transmission, and detection of high-risk areas, a camera assembly is connected to the UAV. Specifically, the UAV and the camera assembly are connected by a connection structure such as a vibration-damping ball. The camera assembly is configured to capture an image during an aerial photographing process of the UAV.

Specifically, the camera assembly includes: a gimbal and a photographing device. The gimbal is connected to the UAV. The photographing device is mounted on the gimbal. The photographing device may be an image capturing device for capturing an image. The photographing device includes but is not limited to: a camera, a video recorder, a webcam, a scanner, a camera phone, etc. The gimbal is configured for mounting the photographing device, so as to fix of the photographing device, or adjust the pose of the photographing device at will (for example, change the height, inclination and/or direction of the photographing device) and stably maintain the photographing device in a set pose. For example, when the UAV performs aerial photography, the gimbal is mainly used for stably maintaining the photographing device in a set posture, to prevent the photographing device from shaking during photographing, thereby ensuring the stability of photographing.

The gimbal includes: a gimbal motor and a gimbal base. The gimbal motor is installed on the gimbal base. The controller of the aircraft may also control the gimbal motor by using the electronic speed controller of the power system. Specifically, the controller of the aircraft is connected to the electronic speed controller. The electronic speed controller is electrically connected to the gimbal motor. The controller of the aircraft generates a gimbal motor control instruction, and the electronic speed controller controls the gimbal motor according to the gimbal motor control instruction.

The gimbal base is connected to the body of the UAV, and is configured to fix the camera assembly to the body of the UAV.

The gimbal motor is connected to the gimbal base and the photographing device. The gimbal may be a multi-axis gimbal, and correspondingly, there are a plurality of gimbal motors, i.e., each axis is provided with one gimbal motor. On the one hand, the gimbal motor may the photographing device to rotate, so as to realize the horizontal rotation and the adjustment of a pitch angle of a photographing shaft, and the rotation of the gimbal motor may be manually controlled remotely or may be automatically controlled by a program, so as to realize all-round scanning and monitoring. On the other hand, in the aerial photographing process of the UAV, the disturbance of the photographing device is offset in real time by the rotation of the gimbal motor, to prevent the photographing device from shaking during photographing, thereby ensuring the stability of photographing.

The photographing device is mounted on the gimbal. An IMU is disposed on the photographing device. The IMU is configured to measure a three-axis attitude angle (or angular velocity) and acceleration of an object. Generally, an IMU is equipped with a three-axis gyroscope and a three-direction accelerometer to measure an angular velocity and acceleration of an object in a three-dimensional space and calculate an attitude of the object. To increase reliability, more sensors may be equipped for each axis. Generally speaking, the IMU needs to be installed at the center of gravity of the UAV.

In the process of controlling the attitude of the UAV, the yaw of the UAV is an important parameter in controlling the attitude of the UAV, and the drive motor needs to be controlled based on the yaw of the UAV. The yaw of the aircraft is obtained in real time by using the controller of the UAV to provide necessary attitude information for the attitude control of the UAV. That is to say, the correct estimation of the yaw of the UAV is particularly important for the attitude control of the UAV. If the yaw of the UAV is estimated incorrectly, the UAV may not be able to fly along a preset direction or trajectory, or may even become unstable and crash.

The yaw fusion of the aircraft is a very difficult and important problem. The yaw of the aircraft is related to the heading direction of the aircraft and influences the performance of the aerial photography UAV in the following aspects:

Centering problem of the gimbal. If the yaw is inaccurate, the direction that the gimbal of the aircraft points to does not coincide with the direction that the nose of the aircraft points to, and an angle exists between them, seriously affecting the photographing and user experience.

The inaccurate yaw affects the heading direction and leads to a problem of oblique flight. In a case that the yaw of the aircraft is inaccurate, when a user sends a forward (backward) flight instruction to the aircraft, the aircraft does not fly in the nose (tail) direction, but in an oblique direction, and there is a lateral velocity component (left/right).

The inaccurate yaw affects the aerial photography performance during orbiting. When the aircraft is orbiting and the gimbal is aimed at the center of orbiting for photographing, inaccurate yaw fusion or a long-term drift may result in that the object to be photographed is not in the center of the image/video, but is on the left or right of the center of the image/video at a certain angle.

When the yaw error has a large error, serious problems such as unexpected orbiting or crashing may occur during normal flight of the aircraft.

When the yaw error has a large error, the control performance is affected, and the stability of the aircraft is decreased.

When the magnetometer of the aircraft is interfered by a magnetic field, serious problems such as unexpected orbiting or crashing may occur when the aircraft is controlled to take off forcibly.

When the aircraft flies in a complex environment with a changing magnetic field, unstable GPS signal, etc., the convergence of yaw is too slow.

In conventional yaw fusion solutions, the yaw of the UAV is usually obtained based on data acquired by the magnetometer. However, the yaw obtained by this method is easily affected by external factors. Especially when the magnetometer is in an environment with strong magnetic interference, the data of the magnetometer may be seriously erroneous, resulting in a large deviation in the estimation of the yaw and low accuracy of estimation of the yaw of the aircraft.

In order to improve the accuracy of yaw estimation of the UAV, currently a commonly used method is to use an external GPS module to estimate a yaw by GPS to correct the yaw value from the magnetometer. However, the GPS signal may sometimes be unstable, and consequently in some cases, the yaw estimated by the magnetometer cannot be effectively corrected even if there is a deviation. That is to say, using the external GPS module to correct the yaw of the UAV can improve the estimation accuracy of the yaw of the aircraft to a certain extent, but the effect is not good. Especially when the GPS signal is weak, using the external GPS module cannot effectively correct the heading direction. Due to the lack of a solution supporting multiple times of realignment, the convergence of the yaw is slow and the precision of the yaw is not high.

Therefore, in view of the above problems, a main objective of the embodiments of the present invention is to provide a method and apparatus for yaw fusion and an aircraft, which can align and correct the yaw of the aircraft based on GPS data, IMU data, and magnetometer data and generate a yaw by fusion, to effectively improve the fusion precision and convergence speed of the yaw, thereby improving the safety and stability of flight of the aircraft.

In the embodiments of the present invention, a corrected yaw, a magnetometer alignment deviation angle, and a GPS realignment deviation angle are fused based on GPS data, IMU data, and magnetometer data. This fusion method can avoid interference from external factors, i.e., can achieve the quick convergence of the yaw in an environment with weak GPS signal and strong magnetic interference, and can improve the fusion precision through multiple times of alignment and correction, thereby effectively improving the safety and stability of flight of the aircraft.

The embodiments of the present invention will be further described in detail below with reference to the accompanying drawings.

Embodiment 1

FIG. 1 is a functional block diagram of a method for yaw fusion according to an embodiment of the present invention.

As shown in FIG. 1, GPS data, IMU data, and magnetometer data are acquired; an above-ground height, GPS velocity signal quality, GPS acceleration signal quality, a yaw deviation angle, a stationary flag, an IMU angular velocity, magnetic field signal quality, and a yaw error angle are determined respectively; the above-ground height, the GPS velocity signal quality, the GPS acceleration signal quality, the yaw deviation angle, the stationary flag, the IMU angular velocity, the magnetic field signal quality, and the yaw error angle are inputted into a yaw fusion algorithm, and fused to generate a fused yaw.

Figure 2:
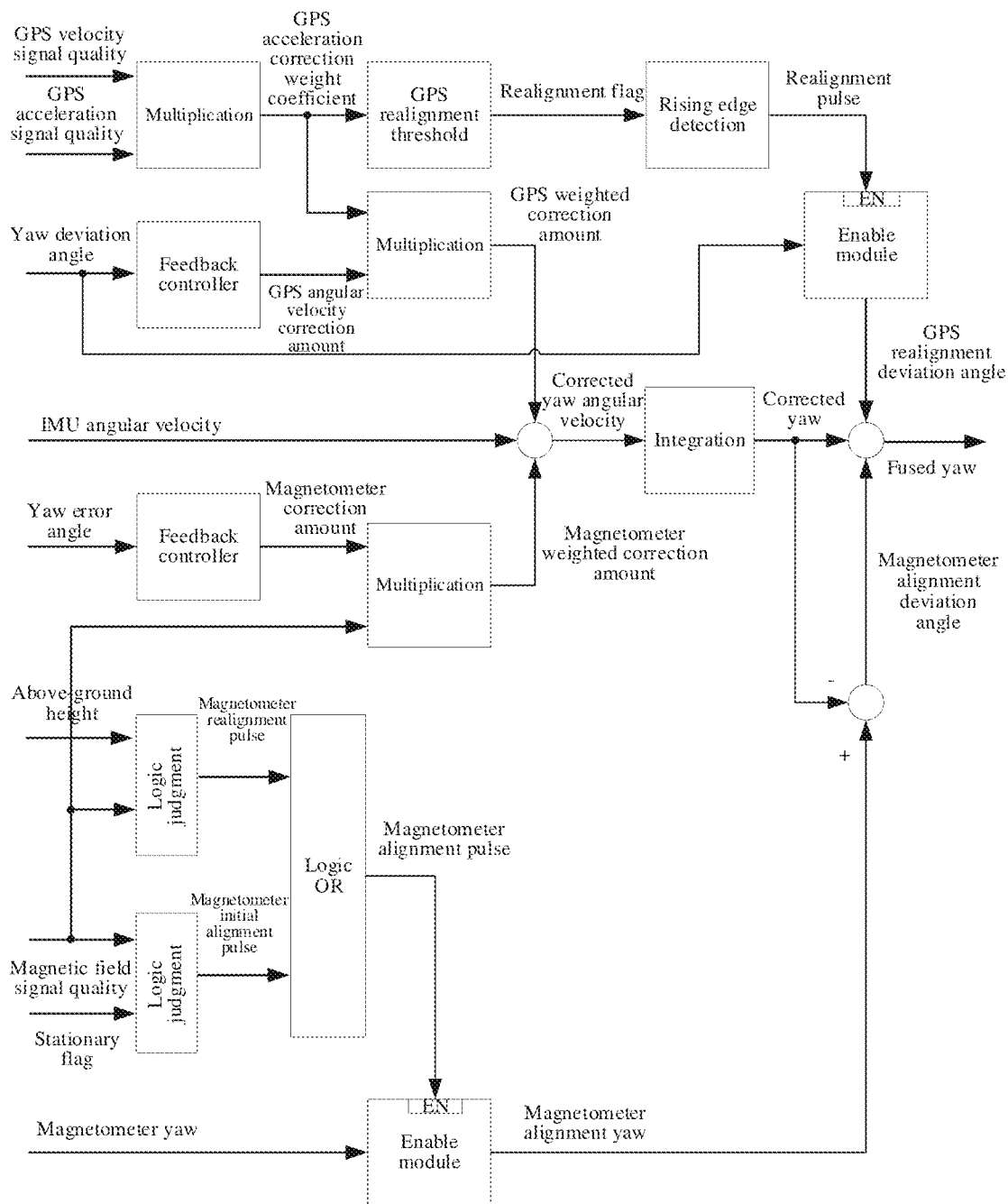
FIG. 2 is a schematic diagram of a yaw fusion algorithm according to an embodiment of the present invention.
Figure 3:
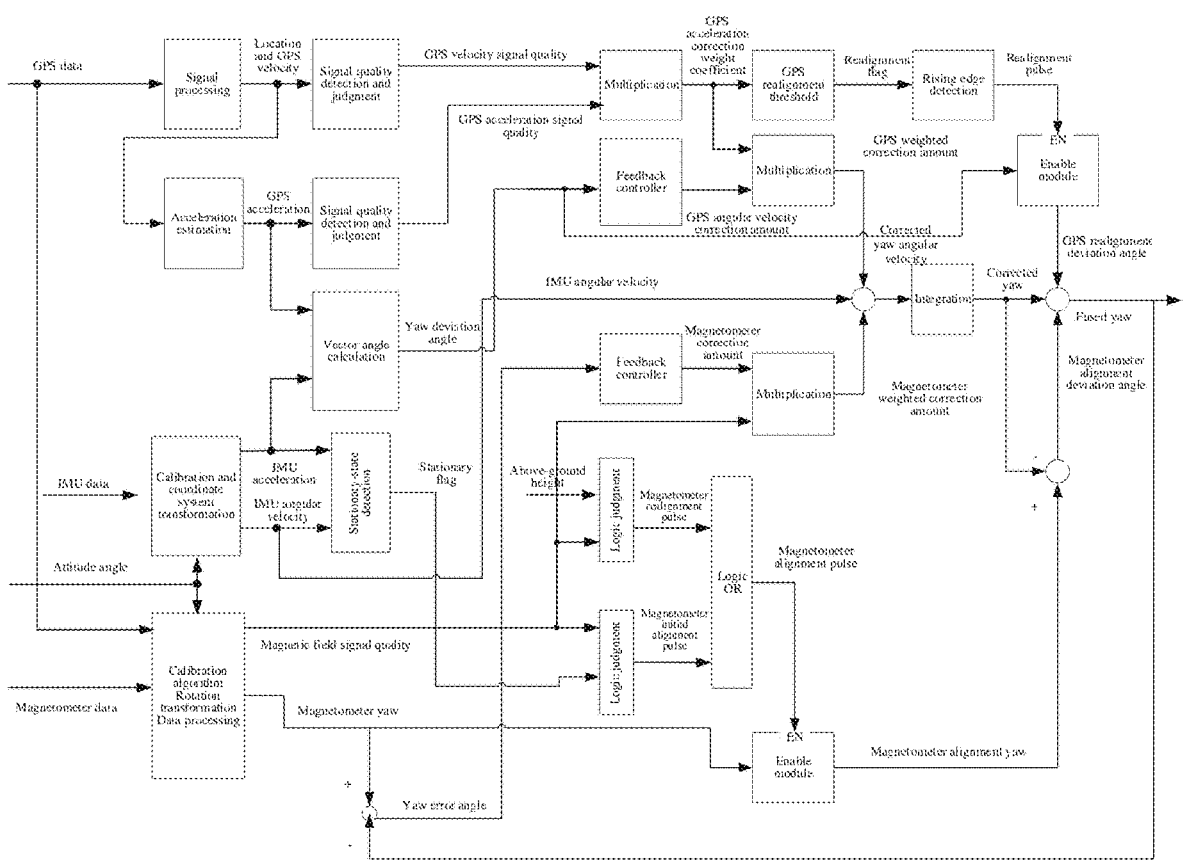
FIG. 3 is an overall schematic diagram of a method for yaw fusion according to an embodiment of the present invention.

FIG. 2 is a schematic diagram of a yaw fusion algorithm according to an embodiment of the present invention. FIG. 3 is an overall schematic diagram of a method for yaw fusion according to an embodiment of the present invention.

As shown in FIG. 2 and FIG. 3, data such as GPS velocity signal quality, GPS acceleration signal quality, a yaw deviation angle, an IMU angular velocity, a yaw error angle, an above-ground height, magnetic field signal quality, a stationary flag, and a magnetometer yaw are acquired, and the data is processed correspondingly, and finally fused to generate a fused yaw.

Figure 4:
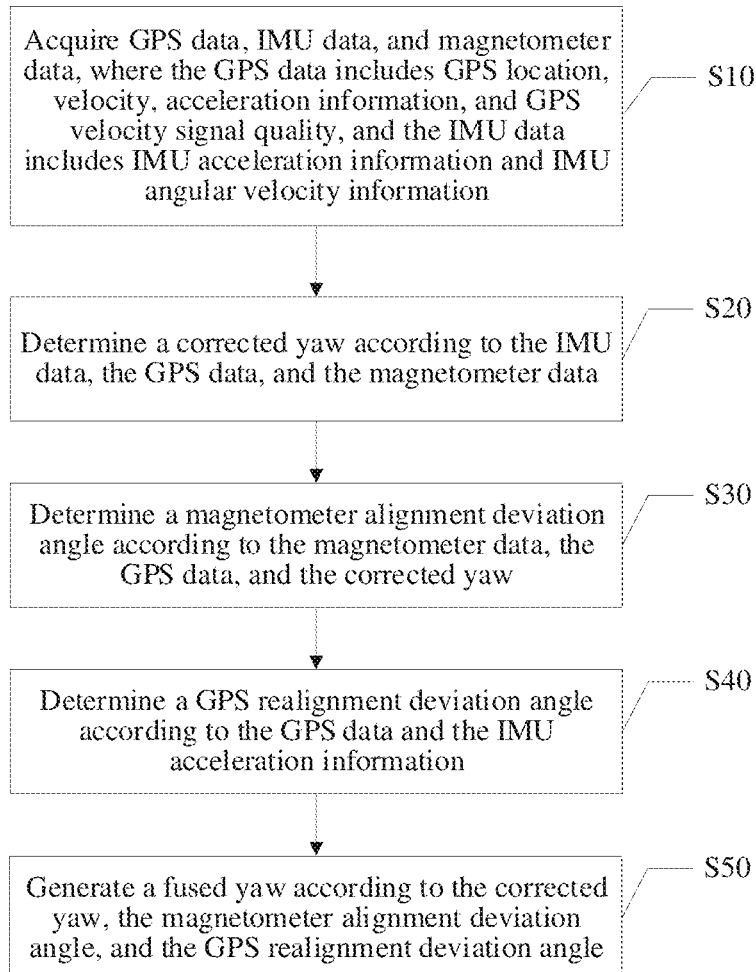
FIG. 4 is a schematic flowchart of a method for yaw fusion according to an embodiment of the present invention.

FIG. 4 is a schematic flowchart of a method for yaw fusion according to an embodiment of the present invention. The method for yaw fusion may be executed by various electronic devices with a certain logic processing capability, such as an aircraft, a control chip, etc. The aircraft may include an UAV, an unmanned spacecraft, and the like. Descriptions are given below by using an aircraft as an example of the electronic device. The aircraft is connected to a gimbal, and the gimbal includes a gimbal motor and a gimbal base. The gimbal may be a multi-axis gimbal, such as a two-axis gimbal or a three-axis gimbal. The three-axis gimbal is used as an example for description below. For specific structures of the aircraft and the gimbal, reference may be made to the above descriptions, and the details will not be repeated herein.

As shown in FIG. 4, the method is applied to an aircraft, such as an unmanned aerial vehicle (UAV), and includes the following steps:

Step S10: Acquire GPS data, IMU data, and magnetometer data, where the GPS data includes GPS location, velocity, acceleration information, and GPS velocity signal quality, and the IMU data includes IMU acceleration information and IMU angular velocity information;

Specifically, the aircraft is equipped with an attitude sensor assembly, and the attitude sensor assembly includes: a GPS, an IMU, a magnetometer, etc. The GPS is configured to acquire the GPS data. The IMU is configured to acquire the IMU data. The magnetometer is configured to acquire the magnetometer data. The IMU includes a gyroscope and an accelerometer. The gyroscope is configured to acquire an IMU angular velocity. The accelerometer is configured to acquire IMU angular velocity information. The GPS data includes location information (latitude and longitude information), GPS velocity information, and GPS acceleration information. The IMU data includes IMU acceleration information and IMU angular velocity information. The magnetometer data includes: magnetic field strength information.

Specifically, the latitude and longitude information and the GPS velocity information are obtained through algorithms such as data processing and filtering. The data processing includes data preprocessing, e.g., decompression, coordinate system transformation, unit transformation, etc. The filtering includes low-pass filtering and Kalman filtering, which are respectively implemented by a low-pass filter and a Kalman filter.

Step S20: Determine a corrected yaw according to the IMU data, the GPS data, and the magnetometer data.

Figure 7:
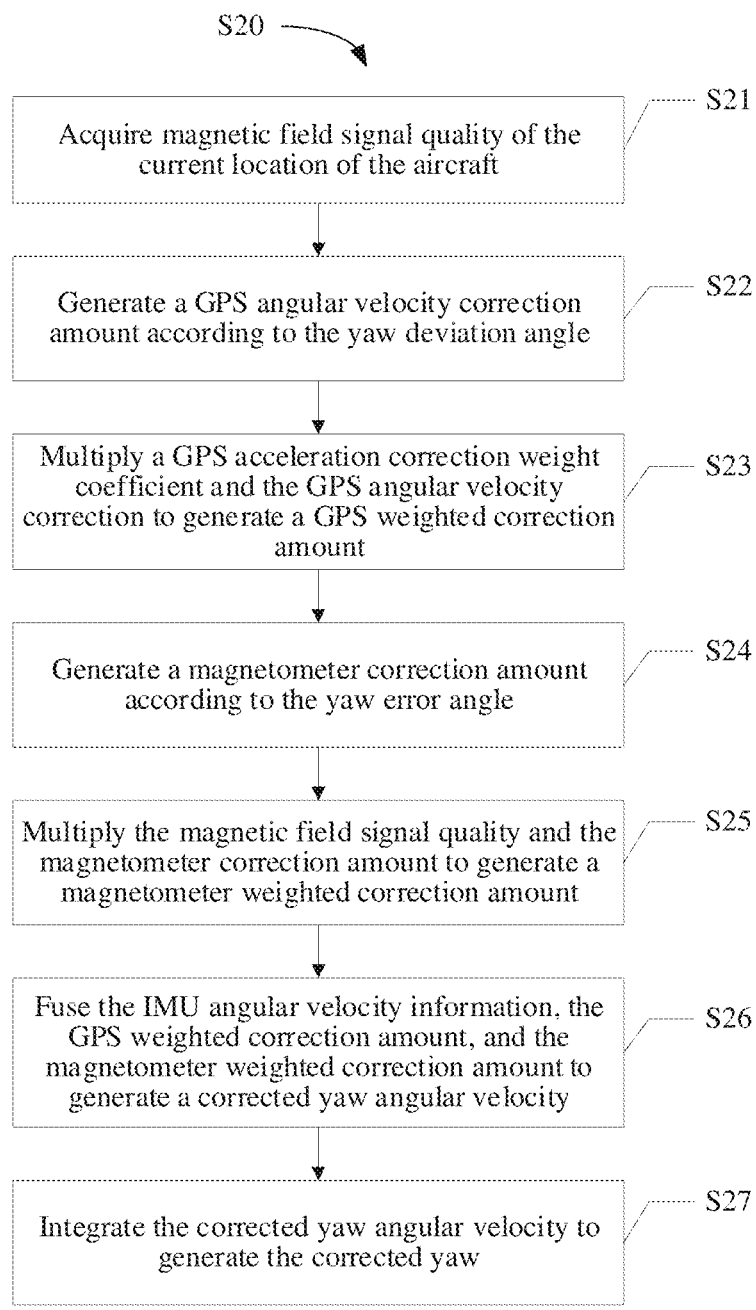
FIG. 7 is a detailed flowchart of step S20 in FIG. 4.

Specifically, FIG. 7 is a detailed flowchart of step S20 in FIG. 4.

As shown in FIG. 7, step S20 includes the following steps:

Step S21: Acquire magnetic field signal quality of the current location of the aircraft.

Specifically, a magnetic field strength of a standard magnetic field at the current location of the aircraft is compared with magnetometer data, i.e., the magnetic field strength, measured by the magnetometer of the aircraft, to obtain the magnetic field signal quality of the current location of the aircraft. If the magnetometer data measured by the magnetometer of the aircraft is greatly different from the magnetic field strength of the standard magnetic field at the current location of the aircraft, it indicates that the magnetic field signal quality is poor. If the magnetometer data measured by the magnetometer of the aircraft is close to the magnetic field strength of the standard magnetic field at the current location of the aircraft, it indicates that the magnetic field signal quality is good. Generally, the magnetic field signal quality of the current location of the aircraft is determined by the amplitude and the inclination angle.

Step S22: Generate a GPS angular velocity correction amount according to the yaw deviation angle.

Specifically, the aircraft is equipped with a feedback controller. The GPS angular velocity correction amount is calculated by the feedback controller according to the yaw deviation angle by using a feedback control algorithm. The GPS angular velocity correction amount is negatively correlated with the yaw deviation angle. For example, GPS angular velocity correction=−K*yaw deviation angle, where K is a value designed by an engineer.

Step S23: Multiply the GPS acceleration correction weight coefficient and the GPS angular velocity correction to generate a GPS weighted correction.

Specifically, the GPS acceleration correction weight coefficient and the GPS angular velocity correction amount are multiplied, and the product is used as the GPS weight correction amount.

As shown in FIG. 1, the GPS acceleration correction weight coefficient is obtained by multiplying the GPS velocity signal quality and GPS acceleration signal quality, and the GPS acceleration signal quality is calculated from the GPS acceleration information. The GPS acceleration signal quality is determined through signal quality detection and judgment based on the GPS acceleration. Specifically, The GPS module provides signal quality which is already set before shipment. A threshold is set. If the signal quality is greater than the threshold, it means that the GPS velocity signal quality is good. If the signal quality is less than the threshold, it means that the GPS velocity signal quality is poor. The threshold is set manually.

After the GPS module provides the GPS velocity signal quality, the GPS velocity information is used to calculate a differential, to obtain the level of differential noise. The differential quality is determined by the noise level. A high noise level indicates a poor quality and a low noise level indicates a good quality. When the GPS velocity signal quality is good and the differential noise is small, it indicates that the GPS acceleration signal quality is good; otherwise, the GPS acceleration signal quality is poor.

Step S24: Generate a magnetometer correction amount according to the yaw error angle.

Specifically, the aircraft is equipped with a feedback controller. The magnetometer correction amount is calculated by the feedback controller based on the yaw error angle by using a feedback control algorithm. The feedback control algorithm is that: the magnetometer correction amount is negatively correlated with the yaw error angle. For example, magnetometer correction amount=−K*yaw error angle, where K is a value designed by an engineer.

step S25: Multiply the magnetic field signal quality and the magnetometer correction amount to generate a magnetometer weighted correction amount.

Specifically, the magnetic field signal quality and the magnetometer correction amount are multiplied, and the product is used as the magnetometer weighted correction amount.

Step S26: Fuse the IMU angular velocity information, the GPS weighted correction amount, and the magnetometer weighted correction amount to generate a corrected yaw angular velocity.

Specifically, The IMU angular velocity information is acquired by an angular velocity meter of the IMU. The IMU angular velocity information, the GPS weighted correction amount, and the magnetometer weighted correction amount are fused to obtain a sum of the IMU angular velocity information, the GPS weighted correction amount, and the magnetometer weighted correction amount, and the sum is used as the corrected yaw angular velocity. The corrected yaw angular velocity is a yaw angular velocity obtained after GPS correction and magnetometer correction.

Step S27: Integrate the corrected yaw angular velocity to generate the corrected yaw.

Specifically, the corrected yaw angular velocity is integrated, and the integral value is used as the corrected yaw.

Step S30: Determine a magnetometer alignment deviation angle according to the magnetometer data, the GPS data, and the corrected yaw.

Figure 8:
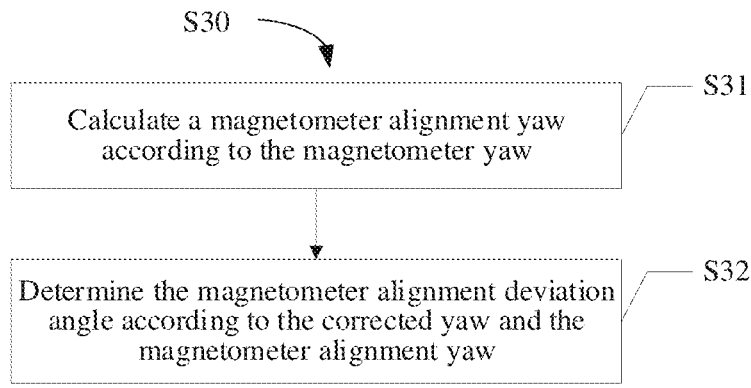
FIG. 8 is a detailed flowchart of step S30 in FIG. 4.

FIG. 8 is a detailed flowchart of step S30 in FIG. 4.

As shown in FIG. 8, the determining a magnetometer alignment deviation angle according to the magnetometer data, the GPS data, and the corrected yaw includes the following steps:

Step S31: Calculate a magnetometer alignment yaw according to the magnetometer yaw.

Specifically, the aircraft is equipped with an enable module, and the alignment is implemented by the enable module. The enable module includes an input end and an output end. Once the enable module detects a pulse, the enable module sends a value of the input end to the output end, so that the output end outputs a high level; otherwise, the output end inputs a low level or is set to zero. The magnetometer alignment yaw is a yaw measured when the magnetometer is aligned, where the pulse is a magnetometer alignment pulse.

It may be understood that in the embodiments of the present invention, the enable module may be replaced with other computing modules, e.g., a multiplication operation module and the like, which all fall within the protection scope of the embodiments of the present invention.

Figure 9:
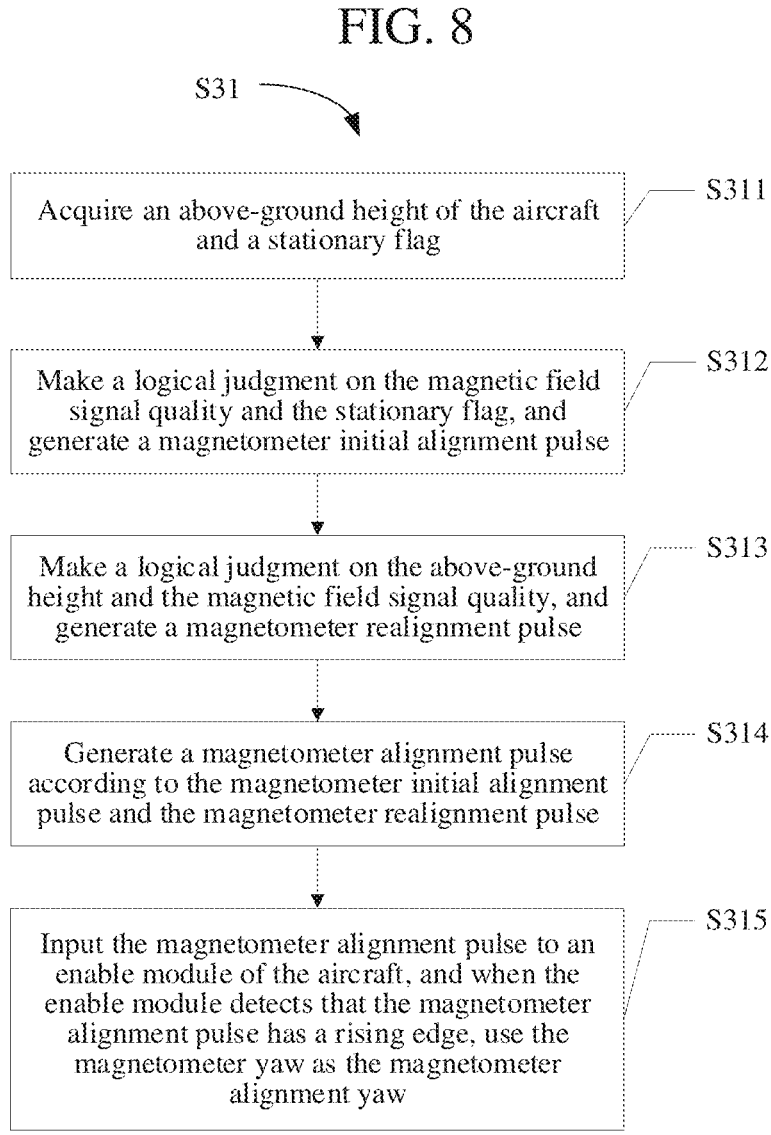
FIG. 9 is a detailed flowchart of step S31 in FIG. 8.

Specifically, FIG. 9 is a detailed flowchart of step S31 in FIG. 8.

As shown in FIG. 9, the calculating a magnetometer alignment yaw according to the magnetometer yaw includes the following steps:

Step S311: Acquire an above-ground height of the aircraft and a stationary flag.

Specifically, the aircraft is equipped with an ultrasonic sensor and/or a time of flight (TOF) sensor. The above-ground height of the aircraft is acquired by the ultrasonic sensor and/or the TOF sensor. The stationary flag is used for representing the stationary state of the aircraft.

Specifically, referring to FIG. 1 again, the acquiring the stationary flag of the aircraft includes:

acquiring an IMU acceleration and an IMU angular velocity in the IMU data; and determining whether the aircraft is in the stationary state by performing stationary-state detection based on the IMU acceleration and the IMU angular velocity. If the aircraft is in the stationary state, the stationary flag has a value of 1. If the aircraft is in a moving state, the stationary flag has a value of 0. It can be understood that the data fluctuations of the IMU acceleration and the IMU angular velocity are very small and stable when the aircraft is stationary, and the data fluctuations of the IMU acceleration and the IMU angular velocity are great when the aircraft is moving. Whether the aircraft is in the stationary state is determined based on this principle. The method further includes: performing coordinate transformation on the IMU data from a body coordinate system to an earth coordinate system according to a rotation transformation matrix to generate an IMU acceleration in the earth coordinate system and an IMU angular velocity in the earth coordinate system; and determining whether the aircraft is in the stationary state according to the IMU acceleration in the earth coordinate system and the IMU angular velocity in the earth coordinate system, and generating the stationary flag of the aircraft.

Step S312: Make a logical judgment on the magnetic field signal quality and the stationary flag, and generate a magnetometer initial alignment pulse.

Specifically, for the logical judgment made on the magnetic field signal quality and the stationary flag, the judgment logic includes:

Step 1. set i=0, and go to Step 2;

Step 2. when the stationary flag signal is 0, the pulse signal F=0, and go to Step 4; when the stationary flag signal is 1, determine whether the magnetic field signal quality is greater than a preset magnetic field signal quality threshold, which is 0.6 in this step; if yes, the pulse signal F outputs 1 and go to Step 3; if not, the pulse signal F outputs 0, and go to Step 4;

Step 3. determine whether the pulse signal F changes from 0 to 1 for the first time; if yes, output a magnetometer initial alignment pulse; if not, output 0, and go to Step 4;

Step 4. set i=i+1, and go back to Step 2.

It can be understood that for the logical judgment made on the magnetic field signal quality and the stationary flag, the magnetic field signal quality threshold may be set according to specific requirements, which is not limited in the present invention.

Step S313: Make a logical judgment on the above-ground height and the magnetic field signal quality, and generate a magnetometer realignment pulse.

Specifically, for the logical judgment made on the above-ground height and the magnetic field signal quality, the judgment logic includes:

Step 1. set i=0, and go to Step 2;

Step 2. when the above-ground height is less than a preset above-ground height threshold, which is set to 0.3 m in this step, the pulse signal F=0, and go to Step 4; when the above-ground height is greater than or equal to the above-ground height threshold, determine whether the magnetic field signal quality is greater than a preset magnetic field signal quality threshold, which is set to 0.6 in this step; if yes, the pulse signal F outputs 1 and go to Step 3; if not, the pulse signal F outputs 0 and go to Step 4;

Step 3. determine whether the pulse signal F changes from 0 to 1 for the first time; if yes, output a magnetometer realignment pulse; if not, output 0, and go to Step 4;

Step 4. set i=i+1, and go back to Step 2.

Step S314: Generate a magnetometer alignment pulse according to the magnetometer initial alignment pulse and the magnetometer realignment pulse.

Specifically, the generating a magnetometer alignment pulse according to the magnetometer initial alignment pulse and the magnetometer realignment pulse includes: performing an OR operation on the magnetometer initial alignment pulse and the magnetometer realignment pulse to generate the magnetometer alignment pulse.

It can be understood that for the logical judgment made on the above-ground height and the magnetic field signal quality, the magnetic field signal quality threshold and the above-ground height threshold may be set according to specific requirements, which are not limited in the present invention.

Step S315: Input the magnetometer alignment pulse to an enable module of the aircraft, and when the enable module detects that the magnetometer alignment pulse has a rising edge, use the magnetometer yaw as the magnetometer alignment yaw.

Specifically, an input end of the enable module, i.e., an enable end, is configured to receive the magnetometer alignment pulse, and input the magnetometer alignment pulse into the enable module of the aircraft. When the enable module detects that the magnetometer alignment pulse signal has a rising edge, the enable module uses the magnetometer yaw as the magnetometer alignment yaw.

Step S32: Determine the magnetometer alignment deviation angle according to the corrected yaw and the magnetometer alignment yaw.

Specifically, referring to FIG. 2 again, the corrected yaw and the magnetometer alignment yaw are fused to generate the magnetometer alignment deviation angle. Specifically, magnetometer alignment deviation angle=−corrected yaw+magnetometer alignment yaw.

Step S40: Determine a GPS realignment deviation angle according to the GPS data and the IMU acceleration information.

Specifically, the GPS data includes GPS acceleration information. The GPS acceleration information is obtained through acceleration estimation based on the GPS velocity information and the location information. The IMU acceleration information is obtained by the accelerometer of the IMU.

Figure 10:
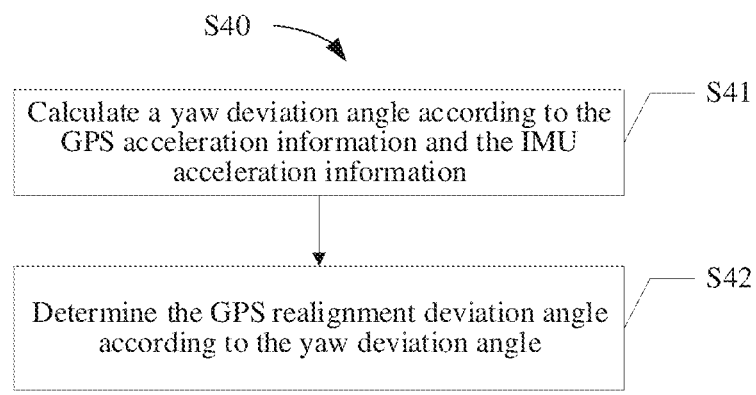
FIG. 10 is a detailed flowchart of step S40 in FIG. 4.

FIG. 10 is a detailed flowchart of step S40 in FIG. 4.

As shown in FIG. 10, the determining a GPS realignment deviation angle according to the GPS data and the IMU acceleration information includes:

Step S41: Calculate a yaw deviation angle according to the GPS acceleration information and the IMU acceleration information.

Specifically, the IMU acceleration information is acceleration information in an earth coordinate system obtained by calibrating measurement data of the IMU by using a calibration matrix and transforming coordinates from a body coordinate system to the earth coordinate system. It can be understood that the calibration matrix is obtained by a user at a place where the flight starts, and the calibration matrix varies at different places on the Earth, and when the aircraft reports magnetometer interference, the user needs to perform calibration in order to determine the calibration matrix.

Step S42: Determine the GPS realignment deviation angle according to the yaw deviation angle.

Specifically, referring to FIG. 2 again, the aircraft is equipped with an enable module. The enable module includes an input end and an output end. When the input end of the enable module receives a realignment pulse, the enable module outputs the yaw deviation angle as a realignment yaw deviation compensation amount, i.e., the GPS realignment deviation angle.

Figure 11:
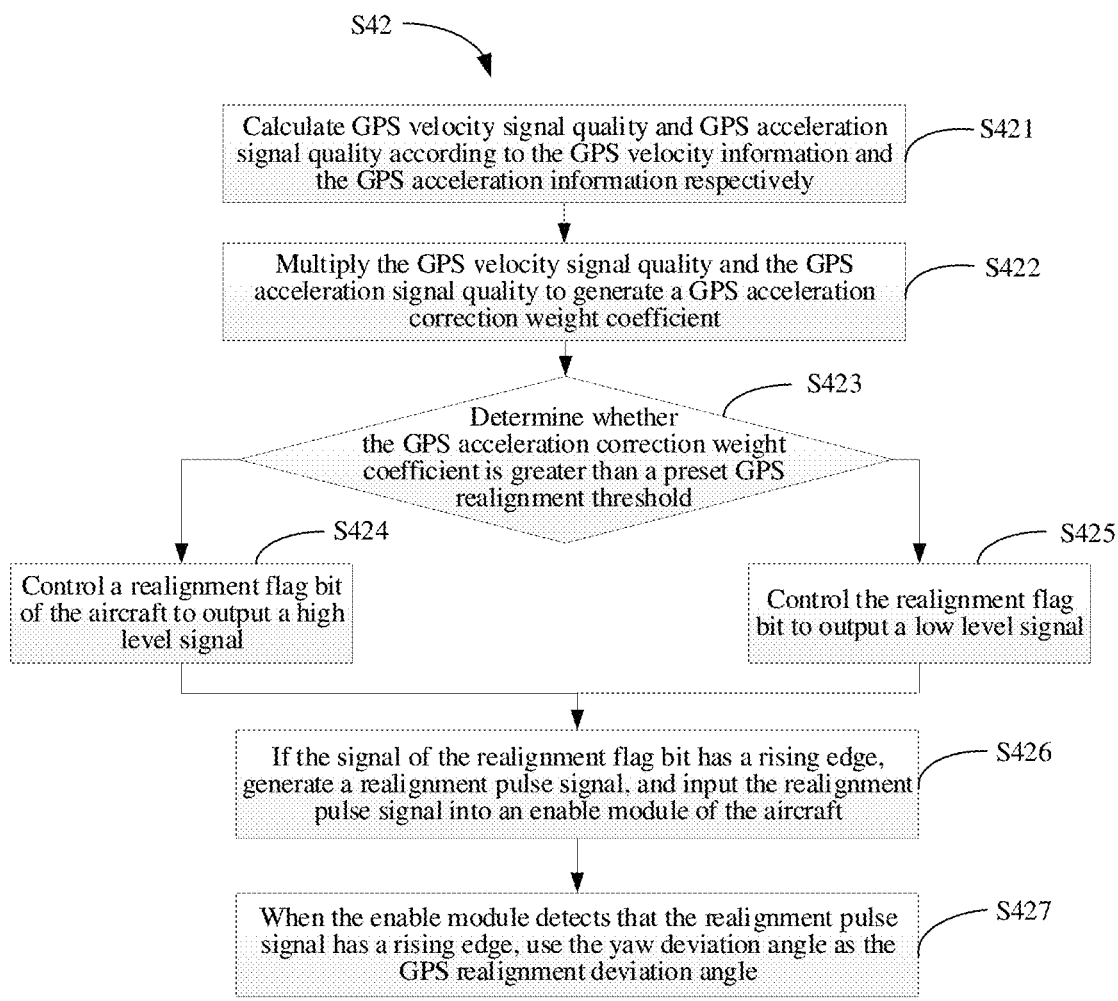
FIG. 11 is a detailed flowchart of step S42 in FIG. 10.

Specifically, referring to FIG. 2 and FIG. 11, FIG. 11 is a detailed flowchart of step S42 in FIG. 10.

As shown in FIG. 11, the determining the GPS realignment deviation angle according to the yaw deviation angle includes:

Step S421: Calculate GPS velocity signal quality and GPS acceleration signal quality according to the GPS velocity information and the GPS acceleration information respectively.

Specifically, according to the GPS location information (latitude and longitude information) and the GPS velocity information obtained by the GPS, and based on a signal quality detection and judgment principle, a GPS velocity signal quality reference value is generated; the GPS velocity signal quality reference value is used as the GPS velocity signal quality; the GPS velocity information obtained by the GPS is differentiated and filtered to generate the GPS acceleration information; and according to the signal quality detection and judgment principle, a GPS acceleration signal quality reference value is generated and used as the GPS acceleration signal quality. The GPS provides the GPS velocity signal quality, and the GPS velocity information acquired by the GPS is used to calculate a differential, to obtain the level of differential noise. The GPS acceleration signal quality is determined by the noise level. A high noise level indicates a poor GPS acceleration signal quality and a low noise level indicates a good GPS acceleration signal quality.

It can be understood that the GPS velocity signal quality and the GPS acceleration signal quality are used for auxiliary reference to reflect the quality of the signal acquired by the GPS, and are positively correlated with the quality of the signal acquired by the GPS. If the quality of the signal acquired by the GPS is good, the values of the GPS velocity signal quality and the GPS acceleration signal quality are large. If the quality of the signal acquired by the GPS is poor, the values of the GPS velocity signal quality and the GPS acceleration signal quality are small.

Step S422: Multiply the GPS velocity signal quality and the GPS acceleration signal quality to generate a GPS acceleration correction weight coefficient.

Specifically, the GPS velocity signal quality and the GPS acceleration signal quality are multiplied, and the value obtained by the multiplication is used as the GPS acceleration correction weight coefficient. The GPS velocity signal quality and the GPS acceleration signal quality are confidence quantization information. The larger the GPS acceleration correction weight coefficient, the higher the confidence; the smaller the GPS acceleration correction weight coefficient, the lower the confidence.

Step S423: Determine whether the GPS acceleration correction weight coefficient is greater than a preset GPS realignment threshold.

Specifically, the aircraft is configured with a realignment flag bit. A GPS realignment threshold is set in advance. The GPS acceleration correction weight coefficient is compared with the GPS realignment threshold. If the GPS acceleration correction weight coefficient is greater than the GPS realignment threshold, go to step S224: Control a realignment flag bit of the aircraft to output a high level signal, i.e., output 1; if the GPS acceleration correction weight coefficient is not greater than the GPS realignment threshold, control the realignment flag bit of the aircraft to output a low level signal, i.e., output 0.

It can be understood that the realignment threshold in the embodiments of the present invention may be manually set according to specific requirements.

Step S424: Control a realignment flag bit of the aircraft to output a high level signal.

Step S425: Control the realignment flag bit to output a low level signal.

Step S426: If the signal of the realignment flag bit has a rising edge, generate a realignment pulse signal, and input the realignment pulse signal into an enable module of the aircraft.

Specifically, the aircraft is equipped with an enable module. It is detected whether the realignment flag bit has a rising edge; if yes, a realignment pulse signal is generated, and the realignment pulse signal is inputted to an input end of the enable module.

Step S427: When the enable module detects that the realignment pulse signal has a rising edge, use the yaw deviation angle as the GPS realignment deviation angle.

Specifically, when the input end of the enable module, i.e., an enable end, receives a pulse, the enable module outputs the yaw deviation angle as the realignment yaw deviation compensation amount, i.e., the GPS realignment deviation angle.

In an embodiment of the present invention, the method further includes: calculating the yaw error angle. Specifically, FIG. 5 is a schematic flowchart of a method for yaw fusion according to an embodiment of the present invention.

Figure 5:
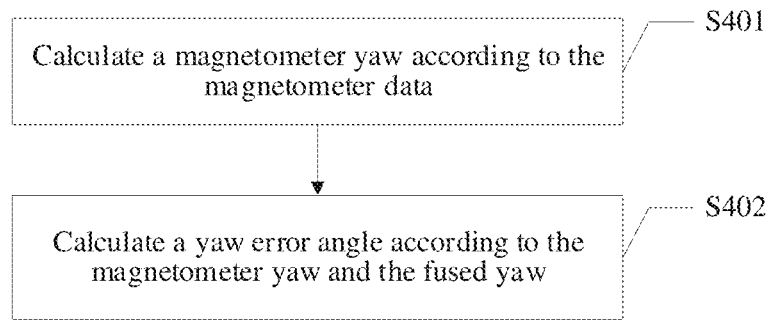
FIG. 5 is a schematic flowchart showing calculation of a yaw error angle according to an embodiment of the present invention.

As shown in FIG. 5, the calculating the yaw error angle includes the following steps:

Step S401: Calculate a magnetometer yaw according to the magnetometer data.

The magnetometer data includes a three-axis magnetic field strength. The GPS longitude and latitude information is used for looking up for a standard magnetic field strength, magnetic inclination angle information, and magnetic declination angle information of the current location of the aircraft. The magnetometer data, i.e., the magnetic field strength measured by the magnetometer, is transformed using a pre-calibrated calibration matrix to obtain calibrated magnetometer data. A magnetic signal quality reference value of the current location of the aircraft is generated according to the calibrated magnetometer data.

Figure 6:
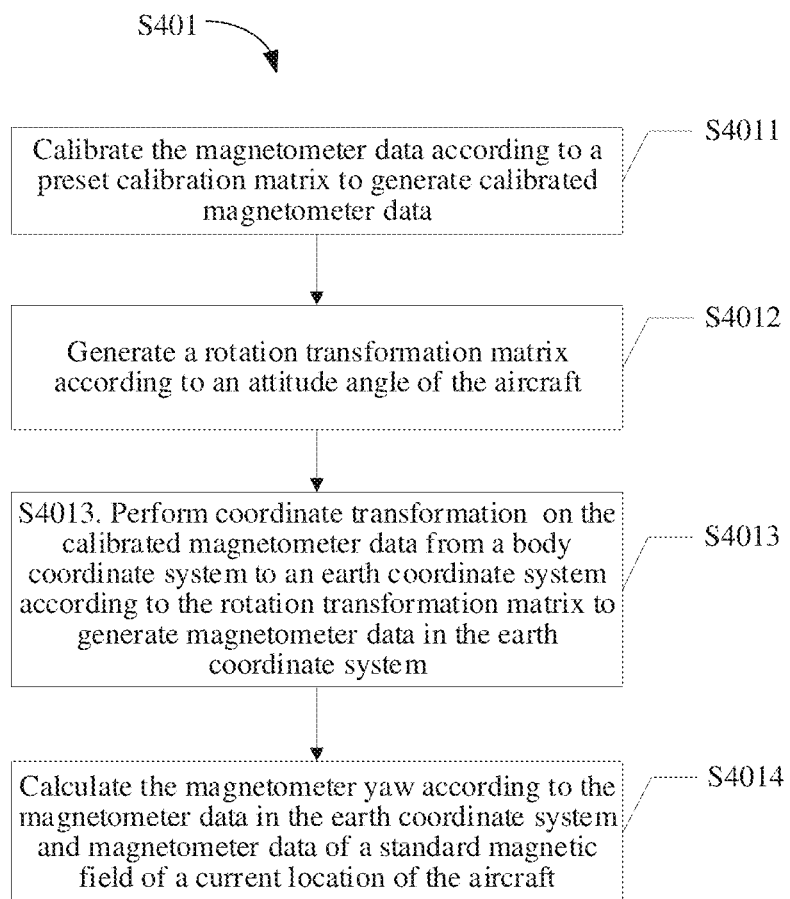
FIG. 6 is a detailed flowchart of step S401 in FIG. 5.

Specifically, FIG. 6 is a detailed flowchart of step S401 in FIG. 5.

As shown in FIG. 6, the calculating a magnetometer yaw according to the magnetometer data includes the following steps:

Step S4011: Calibrate the magnetometer data according to a preset calibration matrix to generate calibrated magnetometer data.

Specifically, the preset calibration matrix is obtained by a user at a place where the flight starts, and the calibration matrix varies at different places on the Earth, and when the aircraft reports magnetometer interference, the user needs to perform calibration in order to determine the calibration matrix.

Step S4012: Generate a rotation transformation matrix according to an attitude angle of the aircraft.

Specifically, the rotation transformation matrix is used for transforming coordinates from the body coordinate system to the earth coordinate system. The attitude angle of the aircraft includes: a yaw, a pitch angle, and a roll angle. The rotation transformation matrix is a 3×3 matrix, where sine and cosine functions of the yaw, the pitch angle, and the roll angle are included, and different functions are selected according to specific situations. Generally speaking, the yaw is rotated first, then the pitch angle is rotated, and finally the roll angle is rotated. For example, the rotation transformation matrix is $$D = \begin{bmatrix} \cos\psi & -\cos\phi\sin\psi & 0 \\ \sin\psi & \cos\phi\cos\psi & 0 \\ 0 & \sin\phi & 1 \end{bmatrix}$$

where, $(\phi, \theta, \psi)$ is the attitude angle, $\phi$ is the roll angle in the attitude angle, $\theta$ is the pitch angle in the attitude angle, and $\psi$ is the yaw in the attitude angle.

Step S4013: Perform coordinate transformation on the calibrated magnetometer data from a body coordinate system to an earth coordinate system according to the rotation transformation matrix to generate magnetometer data in the earth coordinate system.

Specifically, the calibrated magnetometer data, i.e., magnetic field strength, is multiplied by the rotation transformation matrix to generate a magnetic field strength in the earth coordinate system, which is equivalent to transforming the magnetometer data between the body coordinate system and the earth coordinate system.

Step S4014: calculate the magnetometer yaw according to the magnetometer data in the earth coordinate system and magnetometer data of a standard magnetic field of a current location of the aircraft.

Specifically, the current location of the aircraft corresponds to a standard magnetic field, readings of the three axes of the magnetometer form a vector, and the magnetometer data of the standard magnetic field of the current location corresponds to a vector. The magnetometer data in the earth coordinate system is compared with the magnetometer data of the standard magnetic field of the current location of the aircraft, a vector angle between the two is calculated, and the vector angle is used as the magnetometer yaw.

Step S402: Calculate a yaw error angle according to the magnetometer yaw and the fused yaw.

Specifically, error calculation is performed for each sampling step of the aircraft, which is continuously and infinitely performed through the feedback loop. A difference between the obtained fused yaw and the magnetometer yaw is calculated to generate the yaw error angle, which will be carried out endlessly until the aircraft runs out of power. The fused yaw is also endlessly updated, each sampling time point corresponds to a unique fusion yaw, and the yaw error angle is the difference between the magnetometer yaw and the fused yaw. Step S50: Generate a fused yaw according to the corrected yaw, the magnetometer alignment deviation angle, and the GPS realignment deviation angle.

Specifically, the GPS realignment deviation angle, the corrected yaw, and the magnetometer alignment deviation angle are fused to generate a fused yaw, where, fused yaw=GPS realignment deviation angle+corrected yaw+ magnetometer alignment deviation angle.

In an embodiment of the present invention, the correction of the yaw is reflected in the correction of the yaw angular velocity, including GPS correction and magnetometer correction. The alignment of the yaw is reflected in the compensation of the yaw deviation. The initial alignment is magnetometer alignment, and the realignment includes GPS alignment and magnetometer alignment. By the solution adopting multiple times of yaw alignment, the problem of slow convergence of the yaw in the case of flight in a complex environment is solved, and the fusion precision is also improved. The use of the solution with multiple times of alignment and correction increases the robustness of yaw fusion. When the yaw error is large and the magnetometer or GPS information quality is good, rapid compensation can be implemented at a time. In addition, the convergence of the yaw can be ensured by the feedback controller in the case of a small yaw error. Whereby, a series of problems caused by an error in the yaw, such as flight in a harsh magnetic field environment, the yaw drift during long-time orbiting, the erroneous yaw due to magnetic field interference, and oblique flight of the aircraft, are solved.

In this embodiment of the present invention, provided is a method for yaw fusion, applicable to an aircraft, the method including: acquiring GPS data, IMU data, and magnetometer data, where the GPS data includes GPS location, velocity, acceleration information, and GPS velocity signal quality, and the IMU data includes IMU acceleration information and IMU angular velocity information;

determining a corrected yaw according to the IMU data, the GPS data, and the magnetometer data; determining a magnetometer alignment deviation angle according to the magnetometer data, the GPS data, and the corrected yaw; determining a GPS realignment deviation angle according to the GPS data and the IMU acceleration information; and generating a fused yaw according to the corrected yaw, the magnetometer alignment deviation angle, and the GPS realignment deviation angle. Whereby, the embodiments of the present invention can effectively improve the fusion precision and convergence speed of the yaw.

Embodiment 2

Figure 12:
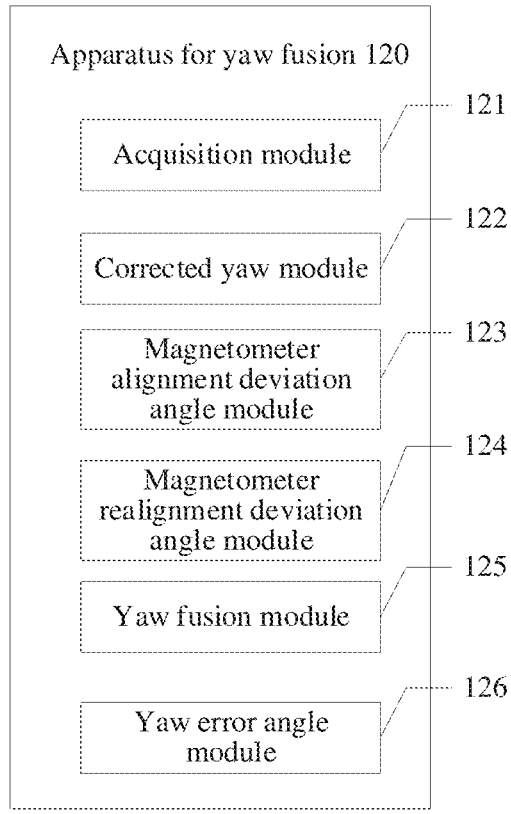
FIG. 12 is a schematic diagram of an apparatus for yaw fusion according to an embodiment of the present invention.

FIG. 12 is a schematic diagram of an apparatus for yaw fusion according to an embodiment of the present invention. The apparatus for yaw fusion 120 may be applied to an aircraft, for example, a UAV.

As shown in FIG. 12, the apparatus for yaw fusion 120 includes:

an acquisition module 121, configured to acquire GPS data, IMU data, and magnetometer data, where the GPS data includes GPS location, velocity, acceleration information, and GPS velocity signal quality, and the IMU data includes IMU acceleration information and IMU angular velocity information;

a corrected yaw module 122, configured to determine a corrected yaw according to the IMU data, the GPS data, and the magnetometer data;

a magnetometer alignment deviation angle module 123, configured to determine a magnetometer alignment deviation angle according to the magnetometer data, the GPS data, and the corrected yaw;

a GPS realignment deviation angle module 124, configured to determine a GPS realignment deviation angle according to the GPS data and the IMU acceleration information;

a yaw fusion module 125, configured to generate a fused yaw according to the corrected yaw, the magnetometer alignment deviation angle, and the GPS realignment deviation angle; and a yaw error angle module 126, configured to calculate a yaw error angle.

Figure 13:
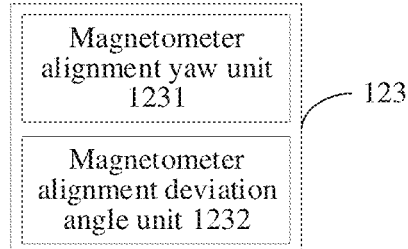
FIG. 13 is a schematic diagram of a magnetometer alignment deviation angle module in FIG. 12.

FIG. 13 is a schematic diagram of a magnetometer alignment deviation angle module in FIG. 12.

As shown in FIG. 13, the magnetometer alignment deviation angle module 123 includes:

a magnetometer alignment yaw unit 1231, configured to calculate a magnetometer alignment yaw according to the magnetometer yaw; and a magnetometer alignment deviation angle unit 1232, configured to determine the magnetometer alignment deviation angle according to the corrected yaw and the magnetometer alignment yaw.

In this embodiment of the present invention, the magnetometer alignment yaw unit 1231 is further configured to:

acquire an above-ground height of the aircraft and a stationary flag;

make a logical judgment on the magnetic field signal quality and the stationary flag, and generate a magnetometer initial alignment pulse;

make a logical judgment on the above-ground height and the magnetic field signal quality, and generate a magnetometer realignment pulse;

generate a magnetometer alignment pulse according to the magnetometer initial alignment pulse and the magnetometer realignment pulse; and if the magnetometer alignment pulse has a rising edge, use the magnetometer yaw as the magnetometer alignment yaw.

Figure 14:
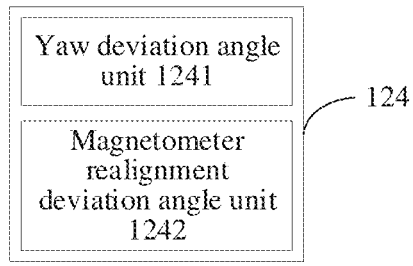
FIG. 14 is a schematic diagram of a GPS realignment deviation angle module in FIG. 12.

FIG. 14 is a schematic diagram of a GPS realignment deviation angle module in FIG. 12.

As shown in FIG. 14, the GPS realignment deviation angle module 124 includes:

a yaw deviation angle unit 1241, configured to calculate a yaw deviation angle according to the GPS acceleration information and the IMU acceleration information; and a GPS realignment deviation angle unit 1242, configured to determine the GPS realignment deviation angle according to the yaw deviation angle.

In an embodiment of the present invention, the GPS realignment deviation angle unit is further configured to:

calculate GPS velocity signal quality and GPS acceleration signal quality according to the GPS velocity information and the GPS acceleration information respectively;

multiply the GPS velocity signal quality and the GPS acceleration signal quality to generate a GPS acceleration correction weight coefficient;

determine whether the GPS acceleration correction weight coefficient is greater than a preset GPS realignment threshold; if yes, control a realignment flag bit of the aircraft to output a high level signal; otherwise, control the realignment flag bit to output a low level signal;

if the signal of the realignment flag bit has a rising edge, generate a realignment pulse signal, and input the realignment pulse signal into an enable module of the aircraft; and when the enable module receives the realignment pulse signal, use the yaw deviation angle as the GPS realignment deviation angle.

Figure 15:
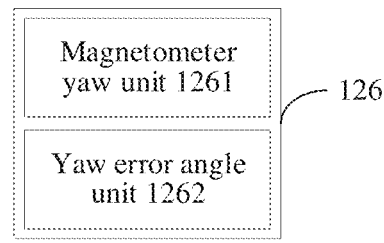
FIG. 15 is a schematic diagram of a yaw error angle module in FIG. 12.

FIG. 15 is a schematic diagram of a yaw error angle module in FIG. 12.

As shown in FIG. 15, the yaw error angle module 126 includes:

a magnetometer yaw unit 1261, configured to calculate a magnetometer yaw according to the magnetometer data; and a yaw error angle unit 1262, configured to calculate a yaw error angle according to the magnetometer yaw and the fused yaw.

In this embodiment of the present invention, the magnetometer yaw unit 1261 is further configured to:

calibrate the magnetometer data according to a preset calibration matrix to generate calibrated magnetometer data;

generate a rotation transformation matrix according to an attitude angle of the aircraft;

perform coordinate transformation on the calibrated magnetometer data from a body coordinate system to an earth coordinate system according to the rotation transformation matrix to generate magnetometer data in the earth coordinate system; and calculate the magnetometer yaw according to the magnetometer data in the earth coordinate system and magnetometer data of a standard magnetic field of a current location of the aircraft.

The apparatus embodiment and the method embodiment are based on the same concept. Therefore, for the content of the apparatus embodiment, reference may be made to the method embodiment as long as there is no conflict, and the details will not be repeated herein.

In this embodiment of the present invention, provided is an apparatus for yaw fusion, applicable to an aircraft, the apparatus including: an acquisition module, configured to acquire GPS data, IMU data, and magnetometer data, where the GPS data includes GPS location, velocity, acceleration information, and GPS velocity signal quality, and the IMU data includes IMU acceleration information and IMU angular velocity information; a corrected yaw module, configured to determine a corrected yaw according to the IMU data, the GPS data, and the magnetometer data; a magnetometer alignment deviation angle module, configured to determine a magnetometer alignment deviation angle according to the magnetometer data, the GPS data, and the corrected yaw; a GPS realignment deviation angle module, configured to determine a GPS realignment deviation angle according to the GPS data and the IMU acceleration information; and a yaw fusion module, configured to generate a fused yaw according to the corrected yaw, the magnetometer alignment deviation angle, and the GPS realignment deviation angle. Whereby, the embodiments of the present invention can effectively improve the fusion precision and convergence speed of the yaw.

Figure 16:
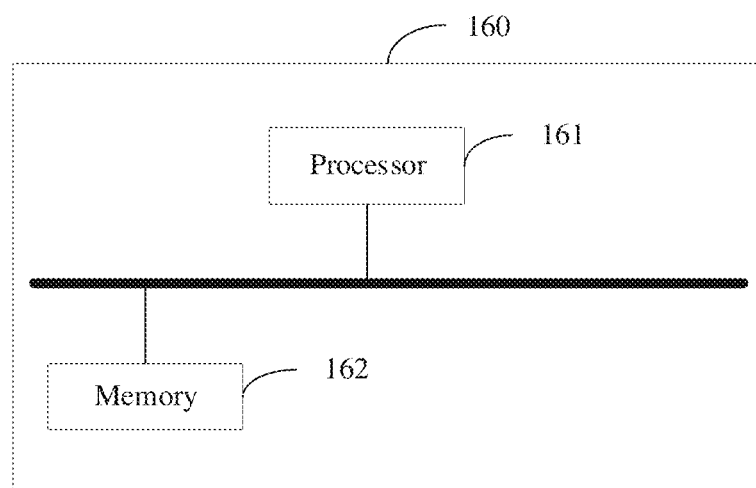
FIG. 16 is a schematic diagram of a hardware structure of an aircraft according to an embodiment of the present invention.

FIG. 16 is a schematic diagram of a hardware structure of an aircraft according to an embodiment of the present invention. The aircraft may be a UAV, an unmanned spacecraft, or other electronic devices.

As shown in FIG. 16, the aircraft 160 includes one or more processors 161 and a memory 162. FIG. 16 uses one processor 161 as an example.

The processor 161 and the memory 162 may be connected by a bus or in other ways. Connection by a bus is used as an example in FIG. 16.

The memory 162, as a non-volatile computer-readable storage medium, may be configured to store a non-volatile software program, a non-volatile computer-executable program, and modules, for example, units corresponding to the method for yaw fusion in the embodiments of the present invention (for example, the modules or units described in FIG. 12 to FIG. 15). By running the non-volatile software programs, instructions, and modules stored in the memory 162, the processor 161 executes various functional applications and data processing in method for yaw fusion, i.e., implements the method for yaw fusion in the above method embodiments and functions of the modules and units of the above apparatus embodiments.

The memory 162 may include a high speed random access memory, and may also include a nonvolatile memory, e.g., at least one magnetic disk storage device, flash memory device, or other nonvolatile solid-state storage device. In some embodiments, the memory 162 may optionally include memories located remotely from the processor 161, and the remote memories may be connected to the processor 161 via a network. Examples of the network include, but are not limited to, the Internet, an intranet, a local area network, a mobile communication network, and combinations thereof.

The modules are stored in the memory 162, and when executed by the one or more processors 161, execute the method for yaw fusion in any of the above method embodiments, e.g., executes the steps shown in FIG. 4 to FIG. 11 above; and may also implement the functions of the modules or units described in FIG. 12 to FIG. 15.

Figure 17:
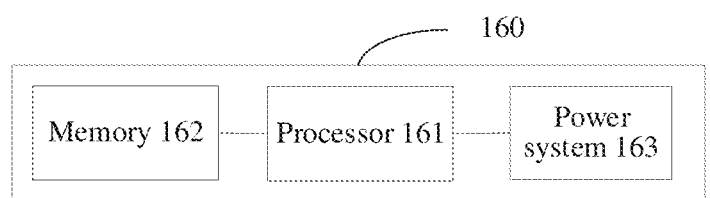
FIG. 17 is a connection block diagram of an aircraft according to an embodiment of the present invention.
Figure 18:
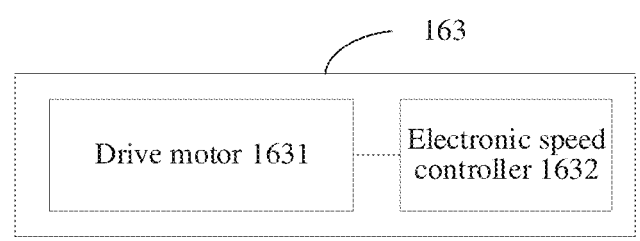
FIG. 18 is a schematic diagram of a power system in FIG. 17.

Referring to FIG. 17 and FIG. 18, the aircraft 160 further includes a power system 163. The power system 163 is configured to provide power for flight of the aircraft. The power system 163 is connected to the processor 161. The power system 163 includes: a drive motor 1631 and an electronic speed controller 1632. The electronic speed controller 1632 is electrically connected to the drive motor 1631 and is configured to control the drive motor 1631. Specifically, the electronic speed controller 1632 generates a control instruction based on a fused yaw obtained after the processor 161 executes the above method for yaw fusion, and controls the drive motor 1631 according to the control instruction.

The aircraft 160 can execute the method for yaw fusion provided in Embodiment 1 of the present invention, and has functional modules and beneficial effects corresponding to the method executed. For technical details that are not described in detail in the embodiments of the aircraft, reference can be made to the method for yaw fusion provided in Embodiment 1 of the present invention.

An embodiment of the present invention provides a computer program product. The computer program product includes a computer program stored on a non-volatile computer-readable storage medium. The computer program includes program instructions. The program instructions, when executed by a computer, cause the computer to execute the above method for yaw fusion. For example, the foregoing step S10 to step S50 of the method in FIG. 4 are executed.

An embodiment of the present invention also provides a non-volatile computer storage medium. The computer storage medium stores computer-executable instructions. The computer-executable instructions, when executed by one or more processors, e.g., a processor 161 in FIG. 16, can cause the one or more processors to execute the method for yaw fusion in any of the above method embodiments, e.g., executes the steps shown in FIG. 4 to FIG. 11 above; and can also cause the one or more processors to implement the functions of the modules or units described in FIG. 12 to FIG. 15.

The apparatus or device embodiments described above are merely exemplary. The units/modules described as separate parts may or may not be physically separate, and parts displayed as modules/units may or may not be physical units, may be located in one position, or may be distributed on a plurality of network modules/units. Some or all of the modules may be selected according to actual needs to achieve the objectives of the solutions of the embodiments.

Based on the descriptions of the foregoing implementations, a person skilled in the art may clearly understand that the implementations may be implemented by software in addition to a universal hardware platform, or by hardware. Based on such an understanding, the foregoing technical solutions essentially or the part contributing to the related technology may be implemented in a form of a software product. The computer software product may be stored in a computer-readable storage medium, such as a read-only medium (ROM)/a random access memory (RAM), a magnetic disk, or an optical disc, and includes several instructions for instructing a computer device (which may be a personal computer, a server, a network device, or the like) to perform the methods described in the embodiments or some parts of the embodiments.

Finally, it should be noted that: the foregoing embodiments are merely used for describing the technical solutions of the present invention, but are not intended to limit the present invention. Under the ideas of the present invention, the technical features in the foregoing embodiments or different embodiments may also be combined, the steps may be performed in any order, and many other changes of different aspects of the present invention also exists as described above, and these changes are not provided in detail for simplicity. Although the present invention is described in detail with reference to the foregoing embodiments, a person of ordinary skill in the art should understand that they may still make modifications to the technical solutions described in the foregoing embodiments or make equivalent replacements to some technical features thereof, and such modifications or replacements do not cause the essence of corresponding technical solutions to depart from the scope of the technical solutions in the embodiments of the present application.

What is claimed is:

1. A method for yaw fusion, applicable to an aircraft, the method comprising:
acquiring global positioning system (GPS) data, inertial measurement unit (IMU) data, and magnetometer data, wherein the GPS data comprises GPS location, velocity, acceleration information, and GPS velocity signal quality, and the IMU data comprises IMU acceleration information and IMU angular velocity information;
determining a corrected yaw according to the IMU data, the GPS data, and the magnetometer data;
determining a magnetometer alignment deviation angle according to the magnetometer data, the GPS data, and the corrected yaw;
determining a GPS realignment deviation angle according to the GPS data and the IMU acceleration information; and
generating a fused yaw according to the corrected yaw, the magnetometer alignment deviation angle, and the GPS realignment deviation angle.

2. The method according to claim 1, wherein the method further comprises:
calculating a magnetometer yaw according to the magnetometer data; and
calculating a yaw error angle according to the magnetometer yaw and the fused yaw.

3. The method according to claim 2, wherein the calculating a magnetometer yaw according to the magnetometer data further comprises:
calibrating the magnetometer data according to a preset calibration matrix to generate calibrated magnetometer data;
generating a rotation transformation matrix according to an attitude angle of the aircraft;
performing coordinate transformation on the calibrated magnetometer data from a body coordinate system to an earth coordinate system according to the rotation transformation matrix to generate magnetometer data in the earth coordinate system; and
calculating the magnetometer yaw according to the magnetometer data in the earth coordinate system and magnetometer data of a standard magnetic field of a current location of the aircraft.

4. The method according to claim 3, wherein the determining a corrected yaw according to the IMU data, the GPS data, and the magnetometer data further comprises:
acquiring magnetic field signal quality of the current location of the aircraft;
generating a GPS angular velocity correction amount according to the yaw deviation angle;
multiplying a GPS acceleration correction weight coefficient and the GPS angular velocity correction to generate a GPS weighted correction amount;
generating a magnetometer correction amount according to the yaw error angle;
multiplying the magnetic field signal quality and the magnetometer correction amount to generate a magnetometer weighted correction amount;
fusing the IMU angular velocity information, the GPS weighted correction amount, and the magnetometer weighted correction amount to generate a corrected yaw angular velocity; and
integrating the corrected yaw angular velocity to generate the corrected yaw,
wherein the GPS acceleration correction weight coefficient is obtained by multiplying the GPS velocity signal quality and GPS acceleration signal quality, and the GPS acceleration signal quality is calculated from the GPS acceleration information.

5. The method according to claim 2, wherein the determining a magnetometer alignment deviation angle according to the magnetometer data, the GPS data, and the corrected yaw comprises:
calculating a magnetometer alignment yaw according to the magnetometer yaw; and
determining the magnetometer alignment deviation angle according to the corrected yaw and the magnetometer alignment yaw.

6. The method according to claim 5, wherein the calculating a magnetometer alignment yaw according to the magnetometer yaw further comprises:
acquiring an above-ground height of the aircraft and a stationary flag;
making a logical judgment on the magnetic field signal quality and the stationary flag, and generate a magnetometer initial alignment pulse;
making a logical judgment on the above-ground height and the magnetic field signal quality, and generate a magnetometer realignment pulse;
generating a magnetometer alignment pulse according to the magnetometer initial alignment pulse and the magnetometer realignment pulse; and
inputting the magnetometer alignment pulse to an enable module of the aircraft, and when the enable module detects that the magnetometer alignment pulse has a rising edge, using the magnetometer yaw as the magnetometer alignment yaw.

7. The method according to claim 1, wherein the determining a GPS realignment deviation angle according to the GPS data and the IMU acceleration information comprises:
calculating a yaw deviation angle according to the GPS acceleration information and the IMU acceleration information;
calculating GPS acceleration signal quality according to the GPS acceleration information;
multiplying the GPS velocity signal quality and the GPS acceleration signal quality to generate a GPS acceleration correction weight coefficient;
determining whether the GPS acceleration correction weight coefficient is greater than a preset GPS realignment threshold; if yes, controlling a realignment flag bit of the aircraft to output a high level signal; otherwise, controlling the realignment flag bit to output a low level signal;
if the signal of the realignment flag bit has a rising edge, generating a realignment pulse signal; and
inputting the realignment pulse signal into an enable module of the aircraft, and when the enable module detects that the realignment pulse signal has a rising edge, using the yaw deviation angle as the GPS realignment deviation angle.

8. An apparatus for yaw fusion, applicable to an aircraft, the apparatus comprising:
at least one processor; and
a memory communicably connected to the at least one processor, wherein
the memory stores instructions executable by the at least one processor, wherein the instructions are executed by the at least one processor to cause the at least one processor to execute:

acquiring global positioning system (GPS) data, inertial measurement unit (IMU) data, and magnetometer data, wherein the GPS data comprises GPS location, velocity, acceleration information, and GPS velocity signal quality, and the IMU data comprises IMU acceleration information and IMU angular velocity information;

determining a corrected yaw according to the IMU data, the GPS data, and the magnetometer data;

determining a magnetometer alignment deviation angle according to the magnetometer data, the GPS data, and the corrected yaw;

determining a GPS realignment deviation angle according to the GPS data and the IMU acceleration information; and generating a fused yaw according to the corrected yaw, the magnetometer alignment deviation angle, and the GPS realignment deviation angle.

9. The apparatus according to claim 8, wherein the processor is further configured to:

calculate a magnetometer yaw according to the magnetometer data; and calculate a yaw error angle according to the magnetometer yaw and the fused yaw.

10. The apparatus according to claim 9, wherein the processor is further configured to:

calibrate the magnetometer data according to a preset calibration matrix to generate calibrated magnetometer data;

generate a rotation transformation matrix according to an attitude angle of the aircraft;

perform coordinate transformation on the calibrated magnetometer data from a body coordinate system to an earth coordinate system according to the rotation transformation matrix to generate magnetometer data in the earth coordinate system; and calculate the magnetometer yaw according to the magnetometer data in the earth coordinate system and magnetometer data of a standard magnetic field of a current location of the aircraft.

11. The apparatus according to claim 10, wherein the processor is further configured to:

acquire magnetic field signal quality of the current location of the aircraft;

generate a GPS angular velocity correction amount according to the yaw deviation angle;

multiply a GPS acceleration correction weight coefficient and the GPS angular velocity correction to generate a GPS weighted correction amount;

generate a magnetometer correction amount according to the yaw error angle;

multiply the magnetic field signal quality and the magnetometer correction amount to generate a magnetometer weighted correction amount;

fuse the IMU angular velocity information, the GPS weighted correction amount, and the magnetometer weighted correction amount to generate a corrected yaw angular velocity; and integrate the corrected yaw angular velocity to generate the corrected yaw, wherein the GPS acceleration correction weight coefficient is obtained by multiplying the GPS velocity signal quality and GPS acceleration signal quality, and the GPS acceleration signal quality is calculated from the GPS acceleration information.

12. The apparatus according to claim 8, wherein the processor is further configured to:

calculate a magnetometer alignment yaw according to the magnetometer yaw; and determine the magnetometer alignment deviation angle according to the corrected yaw and the magnetometer alignment yaw.

13. The apparatus according to claim 12, wherein the processor is further configured to:

acquire an above-ground height of the aircraft and a stationary flag;

make a logical judgment on the magnetic field signal quality and the stationary flag, and generate a magnetometer initial alignment pulse;

make a logical judgment on the above-ground height and the magnetic field signal quality, and generate a magnetometer realignment pulse;

generate a magnetometer alignment pulse according to the magnetometer initial alignment pulse and the magnetometer realignment pulse; and input the magnetometer alignment pulse to an enable module of the aircraft, and when the enable module detects that the magnetometer alignment pulse has a rising edge, using the magnetometer yaw as the magnetometer alignment yaw.

14. The apparatus according to claim 8, wherein the processor is further configured to:

calculate a yaw deviation angle according to the GPS acceleration information and the IMU acceleration information;

calculate GPS acceleration signal quality according to the GPS acceleration information;

multiply the GPS velocity signal quality and the GPS acceleration signal quality to generate a GPS acceleration correction weight coefficient;

determine whether the GPS acceleration correction weight coefficient is greater than a preset GPS realignment threshold; if yes, controlling a realignment flag bit of the aircraft to output a high level signal; otherwise, controlling the realignment flag bit to output a low level signal;

if the signal of the realignment flag bit has a rising edge, generating a realignment pulse signal; and input the realignment pulse signal into an enable module of the aircraft, and when the enable module detects that the realignment pulse signal has a rising edge, using the yaw deviation angle as the GPS realignment deviation angle.

15. An aircraft, comprising:

a fuselage;

an arm, connected to the fuselage;

a power apparatus, disposed on the arm and configured to provide power for the aircraft to fly;

at least one processor; and a memory communicably connected to the at least one processor, wherein the memory stores instructions executable by the at least one processor, wherein the instructions are executed by the at least one processor to cause the at least one processor to execute:

acquiring global positioning system (GPS) data, inertial measurement unit (IMU) data, and magnetometer data, wherein the GPS data comprises GPS location, velocity, acceleration information, and GPS velocity signal quality, and the IMU data comprises IMU acceleration information and IMU angular velocity information;

determining a corrected yaw according to the IMU data, the GPS data, and the magnetometer data;

determining a magnetometer alignment deviation angle according to the magnetometer data, the GPS data, and the corrected yaw;

determining a GPS realignment deviation angle according to the GPS data and the IMU acceleration information; and generating a fused yaw according to the corrected yaw, the magnetometer alignment deviation angle, and the GPS realignment deviation angle.

16. The aircraft according to claim 15, wherein the processor is further configured to:

calculate a magnetometer yaw according to the magnetometer data; and calculate a yaw error angle according to the magnetometer yaw and the fused yaw.

17. The aircraft according to claim 16, wherein the processor is further configured to:

calibrate the magnetometer data according to a preset calibration matrix to generate calibrated magnetometer data;

generate a rotation transformation matrix according to an attitude angle of the aircraft;

perform coordinate transformation on the calibrated magnetometer data from a body coordinate system to an earth coordinate system according to the rotation transformation matrix to generate magnetometer data in the earth coordinate system; and calculate the magnetometer yaw according to the magnetometer data in the earth coordinate system and magnetometer data of a standard magnetic field of a current location of the aircraft.

18. The aircraft according to claim 17, wherein the processor is further configured to:

acquire magnetic field signal quality of the current location of the aircraft;

generate a GPS angular velocity correction amount according to the yaw deviation angle;

multiply a GPS acceleration correction weight coefficient and the GPS angular velocity correction to generate a GPS weighted correction amount;

generate a magnetometer correction amount according to the yaw error angle;

multiply the magnetic field signal quality and the magnetometer correction amount to generate a magnetometer weighted correction amount;

fuse the IMU angular velocity information, the GPS weighted correction amount, and the magnetometer weighted correction amount to generate a corrected yaw angular velocity; and integrate the corrected yaw angular velocity to generate the corrected yaw, wherein the GPS acceleration correction weight coefficient is obtained by multiplying the GPS velocity signal quality and GPS acceleration signal quality, and the GPS acceleration signal quality is calculated from the GPS acceleration information.

19. The aircraft according to claim 15, wherein the processor is further configured to:

calculate a magnetometer alignment yaw according to the magnetometer yaw; and determine the magnetometer alignment deviation angle according to the corrected yaw and the magnetometer alignment yaw.

20. The aircraft according to claim 19, wherein the processor is further configured to:

acquire an above-ground height of the aircraft and a stationary flag;

make a logical judgment on the magnetic field signal quality and the stationary flag, and generate a magnetometer initial alignment pulse;

make a logical judgment on the above-ground height and the magnetic field signal quality, and generate a magnetometer realignment pulse;

generate a magnetometer alignment pulse according to the magnetometer initial alignment pulse and the magnetometer realignment pulse; and input the magnetometer alignment pulse to an enable module of the aircraft, and when the enable module detects that the magnetometer alignment pulse has a rising edge, using the magnetometer yaw as the magnetometer alignment yaw.

21. The aircraft according to claim 15, wherein the processor is further configured to:

calculate a yaw deviation angle according to the GPS acceleration information and the IMU acceleration information;

calculate GPS acceleration signal quality according to the GPS acceleration information;

multiply the GPS velocity signal quality and the GPS acceleration signal quality to generate a GPS acceleration correction weight coefficient;

determine whether the GPS acceleration correction weight coefficient is greater than a preset GPS realignment threshold; if yes, controlling a realignment flag bit of the aircraft to output a high level signal; otherwise, controlling the realignment flag bit to output a low level signal;

if the signal of the realignment flag bit has a rising edge, generating a realignment pulse signal; and input the realignment pulse signal into an enable module of the aircraft, and when the enable module detects that the realignment pulse signal has a rising edge, using the yaw deviation angle as the GPS realignment deviation angle.

* * * * *